(12) United States Patent
Hino et al.

(10) Patent No.: US 7,706,950 B2
(45) Date of Patent: Apr. 27, 2010

(54) CONTROLLING APPARATUS FOR CONTINUOUSLY VARIABLE TRANSMISSION

(75) Inventors: Akira Hino, Aichi-ken (JP); Takashi Yumoto, Aichi-ken (JP); Naoya Inoue, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 741 days.

(21) Appl. No.: 11/551,087

(22) Filed: Oct. 19, 2006

(65) Prior Publication Data
US 2007/0118266 A1 May 24, 2007

(30) Foreign Application Priority Data
Nov. 21, 2005 (JP) ............................. 2005-335726

(51) Int. Cl.
G06F 7/00 (2006.01)
G06F 17/00 (2006.01)

(52) U.S. Cl. ..................... 701/51; 60/605.1; 123/492; 477/175

(58) Field of Classification Search .................. 701/51, 701/1
See application file for complete search history.

(56) References Cited

U.S. PATENT DOCUMENTS

| | | | |
|---|---|---|---|
| 4,720,793 A | | 1/1988 | Watanabe et al. |
| 5,517,410 A | * | 5/1996 | Nakagawa et al. ............ 701/51 |
| 5,522,367 A | * | 6/1996 | Reuschenbach et al. ..... 123/492 |
| 5,775,106 A | * | 7/1998 | Denz et al. .................. 60/605.1 |
| 5,928,301 A | * | 7/1999 | Soga et al. ..................... 701/51 |
| 6,269,289 B1 | * | 7/2001 | Toukura et al. ................ 701/1 |
| 6,269,296 B1 | | 7/2001 | Toukura et al. |
| 6,282,465 B1 | * | 8/2001 | Nishijima et al. .............. 701/1 |
| 6,389,347 B1 | | 5/2002 | Nozaki |
| 2004/0048718 A1 | * | 3/2004 | Tashiro ....................... 477/175 |

FOREIGN PATENT DOCUMENTS

| | | |
|---|---|---|
| DE | 199 33 010 A1 | 1/2000 |
| DE | 100 18 381 A1 | 10/2000 |
| JP | 62225739 A * | 10/1987 |
| JP | 2-85559 | 3/1990 |
| JP | 8-135778 | 5/1996 |
| JP | 2001-330133 | 11/2001 |

* cited by examiner

*Primary Examiner*—Khoi Tran
*Assistant Examiner*—Stephen Holwerda
(74) *Attorney, Agent, or Firm*—Oblon, Spivak, McClelland, Maier & Neustadt, L.L.P

(57) ABSTRACT

A continuously variable transmission 18 changes a speed-change ratio γ so that an actual rotation speed $N_{IN}$ of an input shaft 36 coincides with a target rotation speed $N_{IN}$* set based on a target output P*. A target output calculating portion 156 calculates a first target drive force related value $P_1$* based on both an acceleration required amount Acc and a load of an auxiliary machine $A_{UX}$, calculates a second target drive force related value $P_2$* based on the acceleration required amount without considering the auxiliary machine load, and sets the second drive force related value as the drive force related value P* upon a vehicle regular running. Even when the auxiliary machine load fluctuates in the vehicle regular running the target output does not fluctuate, and prevention of fluctuation of the target output rotation speed increases the drivability in the vehicle regular running.

15 Claims, 10 Drawing Sheets

CONTROLLING APPARATUS FOR CONTINUOUSLY VARIABLE TRANSMISSION

The present application is based on Japanese Patent Application No. 2005-335726 filed on Nov. 21, 2005, the content of which is incorporated herein by reference.

BACKGROUND OF THE INVENTION

1. Field of the Invention

The present invention relates to a controlling apparatus for a continuously variable transmission which changes a speed-change ratio so that an actual rotation speed of an input shaft of the continuously variable transmission coincides with a target rotation speed thereof. In particular, it relates to setting of the target rotation speed upon a vehicle regular running.

2. Description of Related Art

In a vehicle equipped with a continuously variable transmission, a drive force of a power source for running is speed-changed at the continuously variable transmission, and then is transmitted to drive wheels. A target driving force of the drive wheels is set based on an accelerator operation amount and the like, and a target rotation speed of an input shaft of the continuously variable transmission is set based thereon. Then, a speed-change ratio of the continuously variable transmission is controlled by a controlling apparatus so that an actual rotation speed of the input shaft coincides with the above target rotation speed.

A patent document (Japanese Patent Application Laid-open No. 2001-330133) has disclosed an example of such controlling apparatus for the continuously variable transmission apparatus. According to this controlling apparatus, the target drive force for keeping a vehicle speed constant is calculated, and an imaginary throttle open-degree is obtained based thereon by a map. Then, based on the vehicle speed and the imaginary throttle open degree, the target rotation speed of the input shaft is calculated by a speed-change map, whereby the continuously variable transmission is speed-changed.

By the way, the power source for running (for example, engine) is also used for driving an auxiliary machine of the vehicle such as a compressor for air-conditioner. In this case, the above mentioned target drive force is calculated by taking the load required for driving the auxiliary machine into consideration to secure a suitable operation of the auxiliary machine. Accordingly, the target driving force may fluctuate depending on the operating condition i.e., a load of the auxiliary machine, so that the target rotation speed of the continuously variable transmission calculated based on the target driving force may also fluctuate to thereby fluctuate the actual rotation speed. Thus, fluctuation of the actual rotation speed may cause an unexpected fluctuation of the rotation speed of the engine upon a vehicle regular running wherein the vehicle runs, for example, at the constant vehicle speed. In this way, a drivability of the vehicle may be worsened.

SUMMARY OF THE INVENTION

The present invention is made in view of the above circumstances, and has an object to provide, in a continuously variable transmission apparatus which changes a speed-change ratio so that an actual rotation speed of the input shaft coincides with a target rotation speed thereof set based on a target driving force related value, a controlling apparatus which can improve a drivability upon the vehicle regular running.

For achieving the above object, a controlling apparatus for a continuously variable transmission, in which the continuously variable transmission is disposed in a power transmitting route extending from a power source for running to driving wheels of a vehicle, and the controlling apparatus sets a target rotation speed of an input shaft of the continuously variable transmission based on a target drive force related value related to a target drive force of the driving wheels, and changes a speed-change ratio so that an actual rotation speed of the input shaft coincides with the target rotation speed thereof, wherein the controlling apparatus includes a target drive force related value setting means or portion which (i) calculates a first target drive force related value based on both an acceleration required amount and a load of an auxiliary machine driven by the power source for running, (ii) calculates a second target drive force related value based on the acceleration required amount without considering the auxiliary machine load, and (iii) sets the second drive force related value as the drive force related value upon a vehicle regular running.

According to the present invention, even when the auxiliary machine load fluctuates in the vehicle regular running, the target drive force related value does not fluctuate to thereby prevent the target rotation speed from fluctuating. As a result, unexpected change of the engine rotation speed is prevented to thereby improve the drivability of vehicle upon the vehicle regular running.

The controlling apparatus may further includes an automatic vehicle speed controlling mean or portion for automatically controlling, upon the vehicle regular running, the vehicle speed to be coincided with the target vehicle speed set in advance regardless of an accelerator operation amount, and the target drive force related value setting means or portion receives a controlled result from the automatic vehicle speed controlling means or portion to calculate the second drive force related value for the target vehicle speed. As a result, the drivability of vehicle when the vehicle speed is kept in the target vehicle speed regardless of the accelerator operation amount, for example upon the cruise control, can be improved.

The controlling apparatus may further includes a target drive force calculating means or portion for calculating the target drive force, and target drive force related value setting means or portion receives a calculated result from the target drive force calculating means or portion. Calculated results of an accelerator open-degree calculating means or portion and the automatic vehicle speed controlling means or portion may be inputted into the target drive force calculating means or portion. In a vehicle normal running other than the vehicle regular running, the target drive force calculating means or portion calculates the target drive force upon the vehicle normal running, based on an accelerator open-degree and a vehicle speed both detected by the accelerator open-degree calculating means or portion. To the contrary, in the vehicle regular running, the target drive force calculating means or portion calculates the target force upon the regular running, based on a signal from the automatic vehicle speed controlling means or portion and a signal corresponding to a vehicle running condition. Between the target drive force calculating means or portion and the automatic vehicle speed controlling means or portion, an automatic vehicle speed control on/off judging means or portion for judging on/off of the automatic vehicle speed control by the automatic vehicle speed controlling means or portion is disposed.

The controlling apparatus may further includes an auxiliary machine load calculating means or portion for calculating the auxiliary machine load, and the target drive force related values setting means or portion receives a calculated result from the auxiliary machine load calculating means or portion. The target drive force related value setting means or portion can have a first target output calculating part for calculation of the first target drive force related value, and a second target output calculating part for calculation of the second target drive force related value. The controlling apparatus may further include a target rotation speed calculating means or portion for calculating a target rotation speed based on a target output set by the target drive force related value setting means or portion based on the target rotation speed. The controlling apparatus may further include a transitional target rotation speed calculating means or portion for calculating a transitional target rotation speed based on the target rotation speed set by the target rotation speed calculating means or portion.

The continuously variable transmission can have a first rotary member attached to the input shaft axially non-shiftably and circumferentially non-rotatable, a second rotary member attached to the input shaft axially shiftable but circumferentially non-rotatably and forming V-shaped groove together with the first rotary member, and the second rotary member being axially shifted to change the speed-change ratio.

A controlling method for a continuously variable transmission, in which the continuously variable transmission is disposed in a power transmitting route extending from a power source for running to driving wheels of a vehicle, and the controlling method sets a target rotation speed of an input shaft of the continuously variable transmission based on a target drive force related value related to a target drive force of the driving wheels, and changes a speed-change ratio so that an actual rotation speed of the input shaft coincides with the target rotation speed thereof, including steps of:

a step for calculating a first target drive force related value based on both an acceleration required amount and a load of an auxiliary machine driven by the power source for running, and a second target drive force related value based on the acceleration required amount without considering the auxiliary machine load; and a step for setting the second drive force related value as the drive force related value upon a vehicle regular running.

The above acceleration required amount is the amount exhibiting magnitude of the driver's intension for the acceleration, for which an accelerator operate speed can be used, which includes, for example, an accelerator operation amount (accelerator open-degree) exhibiting the depressed amount of the accelerator pedal, a throttle valve open-degree exhibiting the open-degree of the throttle corresponding to the accelerator open-degree, a change rate of the accelerator open-degree, and a change rate of the throttle open-degree. Also, a fuel inject amount exhibiting the inject amount of the fuel corresponding to the accelerator open-degree, which is injected into a chamber formed in the import tube or into a cylinder, or an suction air amount to be sucked through the inlet tube can be used therefore.

The above drive force related value is a related value (corresponding value) which one-to-one corresponds to the vehicle drive force (hereinafter, briefly called as drive force). As the drive force related value, in addition to the drive force, following various factors can be preferably employed. Included are, for example, a vehicle acceleration, a torque on an axel as a drive shaft torque (hereinafter, briefly called as an axle torque), an output of the vehicle (hereinafter, briefly called as an output or a power), a torque on a crank shaft as an output torque of the engine (hereinafter, briefly called as an engine torque), a torque on a turbine shaft of a torque converter as an output torque of the torque converter (hereinafter, briefly called as turbine torque), a torque on an input shaft as an input torque of the continuously variable transmission (hereinafter, briefly called as an input shaft torque), and a torque on an output shaft as an output torque of the continuously variable transmission (hereinafter, briefly called as an output shaft torque).

The continuously variable transmission preferably includes following two types. A first type is a so-called belt-type continuously variable transmission, in which a transmit belt functioning as the power transmitting member is wound around a pair of pulleys of which effective radius can be changed, so that the speed-change ratio is changed continuously variable. A second type is a so-called traction-type continuously variable transmission which include a pair of cones rotating on a common axis, and plural rollers each rotating about rotary axes each perpendicular to the common axis. The plural rollers are nipped with the paired cones and rocked so that an intersecting angles between the rotary axes and the common axis change. In this way, the speed-change ratio is changed.

The continuously variable transmission can be preferably mounted onto the vehicle in one of a lateral posture and a longitudinal posture. In the lateral posture, the axis of the transmission corresponds to the vehicle width (right-left) direction which is suitable for so-called front-engine, front-drive type vehicle. In the longitudinal posture, the axis of the transmission corresponds to the vehicle front-rear direction which is suitable for so-called front-engine, rear-drive type vehicle. As the power source for running, an engine which is an internal-combustion engine such as a gasoline engine and a diesel engine has been widely used. As an auxiliary power source for running, a motor and the like can be used together with the internal-combustion engine. Alternatively, only the motor and the like is used as the power source for running.

Noted that expression of "supplying hydraulic pressure" includes both "causing the hydraulic pressure to act", and "supplying an operation oil of which hydraulic pressure is controlled".

DETAILED DESCRIPTION OF THE PREFERRED EMBODIMENT

Hereinafter, preferred embodiments of the present invention will be explained in detail, with reference to attached drawings.

Figure 1:
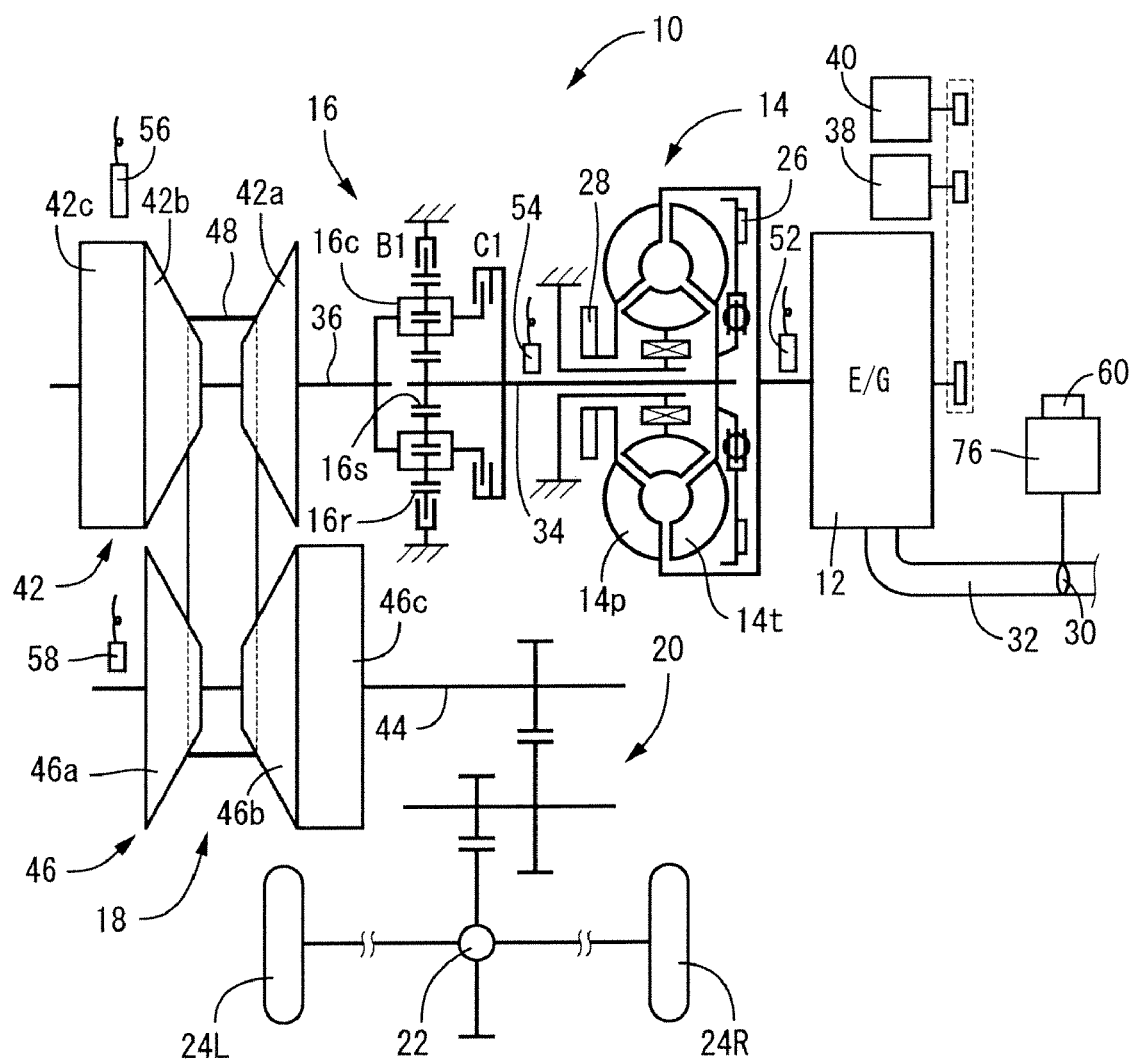
FIG. 1 is a framework view explaining a drive apparatus for vehicle to which the present invention is applied.

FIG. 1 is a framework explaining construction of a driving apparatus for vehicle to which the present invention is applied. This driving apparatus for vehicle is suitably mounted onto a front-engine, front-drive type vehicle, and includes a laterally arranged automatic transmission 10, an engine 12 as a driving source for running and the like. The laterally arranged transmission 10 has a forward/rearward running switch device 16 and a continuously variable transmission 18. An output of the engine 12 constructed by an internal combustion engine is transmitted to a differential gear unit 22 via a crankshaft of the engine 12, a torque converter 14 functioning as a hydrodynamic power transmitting device, a forward/rearward running switching device (steering reverser) 16, a belt-type continuously variable transmission (CVT) 18, and a reduction gear device 20. Then, the output is distributed to a left driving wheel 24L and a right driving wheel 24R.

The torque converter 14 includes a pump impeller 14$p$ connected to a crankshaft of the engine 12, and a turbine impeller 14$t$ connected to the forward/rearward running switching device 16 via a turbine shaft 34 corresponding to an output side member of the torque converter 14. The torque converter 14, utilizing fluid contained therein, amplifies the torque produced by the engine 12 and transmits the amplified torque to the forward/rearward running switching device 16. Between the pump impeller 14$p$ and the turbine impeller 14$t$ a lockup clutch 26 is provided, and a supply of hydraulic pressure to an oil chamber at an engaging side or to an oil chamber at a releasing side is switched by switch valve solenoid by switching valve (not shown) provided in a hydraulic controlling circuit 100 (refer to FIGS. 2 and 3). Thus, the lockup clutch 26 is engaged or released, and when engaged completely the pumping impeller 14$p$ and the turbine impeller 14$t$ rotate integrally.

To the pumping impeller 14$p$, a mechanical-type oil pump 28 driven by the engine 12 is connected to generate a hydraulic pressure to be used to speed-change the continuously variable transmission 18, to generate a belt nip force, to engage/release the lockup clutch 26, and to supply a lubricant oil to various parts.

The forward/rearward running switching device 16 is constructed mainly by a planetary gear unit of double-pinion type, and includes a sun gear 16$s$, a carrier 16$c$ and a ring gear 16$r$. A turbine shaft 34 of the torque converter 14 is connected to the sun gear 16$s$ integrally, and an input shaft 36 of the continuously variable transmission apparatus 18 being positioned on the same axis as the turbine shaft 34 is connected to the carrier 16$c$ integrally. The sun gear 16$s$ and the carrier 16$c$ are selectively connected via a clutch C1 for forward running. The ring gear 16$r$ is selectively fixed to a housing via a brake B1 for rearward running. The clutch C1 for forward running and the brake B1 for rearward running both corresponding to a connect/interrupt device, are a hydraulic type frictionally engaging apparatus which is brought into a frictionally engaged state by a hydraulic cylinder.

With engagement of the clutch C1 for forward running and release (disengagement) of the brake B1 for rearward running, the forward/rearward running switching device 16 is brought into an integrally rotating state to connect the turbine shaft 34 to the input shaft 36 directly. In this state, a driving force transmitting route for forward running is established to transmit the driving force for forward running from the forward/rearward running switch device 16 to the continuously variable transmission apparatus 18.

To the contrary, with engagement of the brake B1 for rearward running and release (disengagement) of the clutch C1 for forward running, the forward/rearward running switching device 16 is brought into a state to establish a driving force transmitting route for rearward running, so that the input shaft 36 rotates in a direction reverse to the turbine shaft 34. Thus, the driving force for rearward running is transmitted from the forward/rearward running switch device 16 to the continuously variable transmission apparatus 18. Meanwhile, when both the clutch C1 for forward running and the brake B1 for rearward running are released, the forward/rearward running device 16 is brought into a neutral (interrupt) state to interrupt transmission of the driving force.

The continuously variable transmission apparatus 18 includes a radius variable pulley 42 at input side, a radius variable pulley 46 at output side, and a transmitting belt 48 wound therearound. In detail, the radius variable pulley (primary sheave) 42 corresponding to an input side member is attached to the input shaft 36 so that an effective radius thereof can be adjusted, and the radius variable pulley (secondary sheave) 46 corresponding to an output side member is attached to an output shaft 44 which is parallel to the shaft 36 so that an effective radius thereof can be adjusted. Using the frictional force among the radius variable pulley at input side 42, the radius variable pulley at output side 46 and the transmitting belt 48, the continuously variable transmission apparatus 18 can transmit the driving force.

The radius variable pulleys 42 and 46 respectively include rotary members 42a and 46a; rotary members 42b and 46b; and an input side hydraulic cylinder 42c and an output side hydraulic piston 46c. In detail, each of the rotary members 42a and 46a is mounted onto each of the input shaft 36 and the output shaft 44 to be non-shiftable in an axial direction and non-rotatable in a circumferential direction relative thereto. Each of the rotary members 42b and 46b is mounted onto the input shaft 36 or the output shaft 44 to be shiftable and non-rotatable thereto. The input side hydraulic cylinder 42c applies a propelling force to the rotary member 42b to adjust width of a V-shaped groove formed between the rotary members 42a and 42b, while the output side hydraulic cylinder 46c applies a propelling force to the rotary member 46b to adjust width of a V-shaped groove formed between the rotary members 46a and 46b.

Specifically, controlling the hydraulic pressure (speed-change control pressure $P_{RATIO}$, refer to FIG. 3) of the input side hydraulic cylinder 42c by the hydraulic controlling circuit 100, widths of the V-shaped grooves of the radius variable pulleys 42 and 46 are adjusted to change an engaging radius (effective radius) of the transmitting belt 48 relative therewith. Thus, the speed-change ratio γ (=input shaft rotation speed $N_{IN}$/output shaft rotation speed $N_{OUT}$) is changed continuously. Hydraulic pressure (nip force control pressure $P_{BELT}$, refer to FIG. 3) of the output side hydraulic cylinder 46c is adjusted by the hydraulic controlling circuit 100 so that the transmitting belt 48 is not slipped over the radius variable pulleys 42 and 46.

An alternator 38 and a compressor 40 for air conditioner (hereinafter, briefly referred to as "auxiliary machine A", unless distinguished from each other) are operably connected to the engine 12 via a belt and the like, to be operated thereby.

Figure 2:
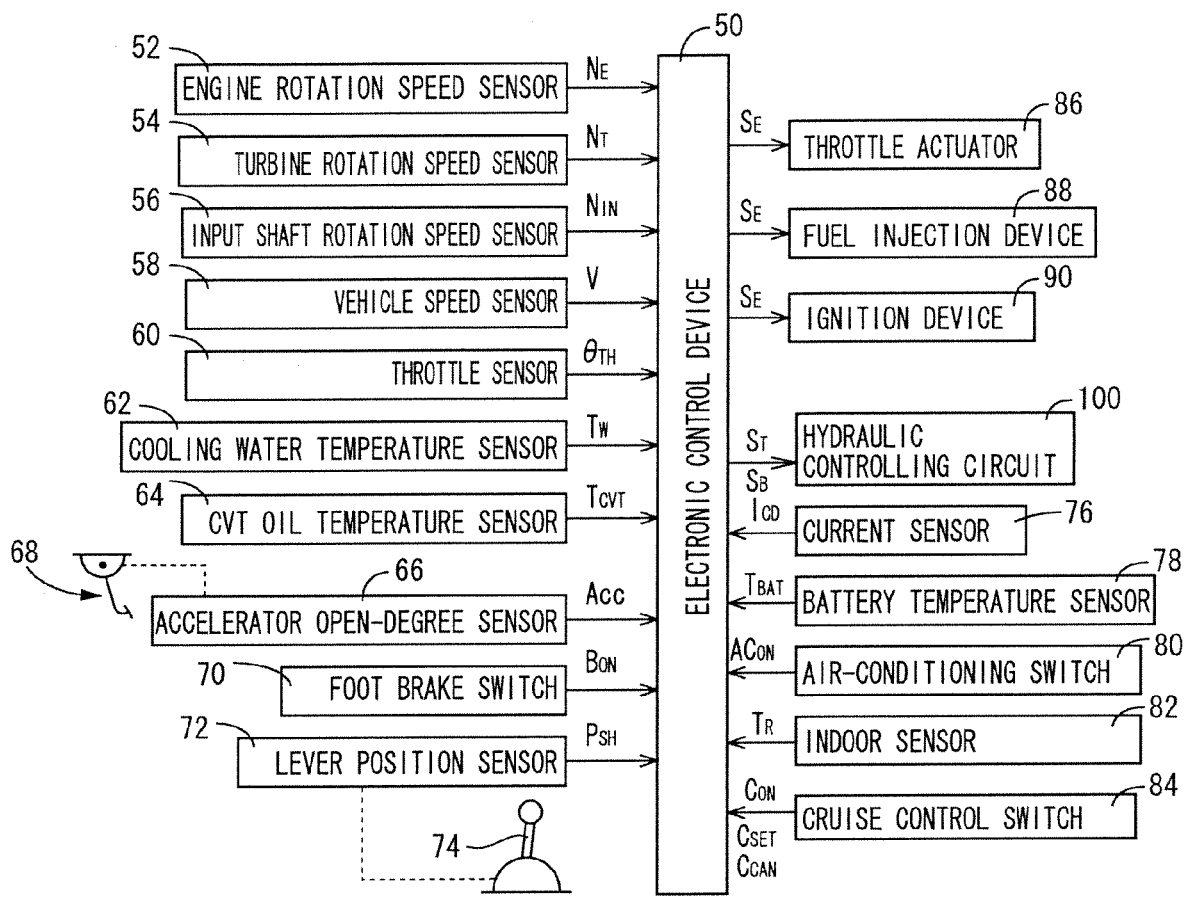
FIG. 2 is a block diagram explaining a main part of a control system provided on the vehicle for controlling the drive apparatus for vehicle shown in FIG. 1.

FIG. 2 is a block diagram explaining a main part of a control system which is provided in the vehicle for controlling the driving apparatus for vehicle 10 and the like shown in FIG. 1, and which includes an electronic controlling apparatus 50 and many sensors 52, 54 - - - . The electronic controlling apparatus 50 is constructed by so-called microcomputer which includes a CPU, a RAM, a ROM and an input/output interface. The CPU performs a predetermined signal processing in accordance with a program stored in the ROM by a temporary memory function of the RAM, so that an output control of the engine 12, both a speed-change control and a nip force control of the continuously variable transmission device 18, and a torque capacity control of the lockup clutch 26 are performed. If needed, the electronic controlling apparatus 50 can be constructed by plural parts, one part of which is used for controlling the engine 12, and other part of which is used for controlling the hydraulic pressure of the continuously variable transmission apparatus 18 and the lockup clutch 26.

Into the electronic controlling apparatus 50, various signals detected by various sensors 52, 54 - - - are inputted. Specifically, a signal representing a crankshaft rotation speed is inputted into the electronic controlling apparatus 50, which corresponds to both a crankshaft rotation angle (position) $A_{CR}(°)$ and a rotation speed of the engine 12 (engine rotation speed) $N_E$ both detected by an engine rotation sensor 52, Also inputted are a signal representing rotation speed of the turbine shaft 34 (turbine rotation speed) $N_T$ detected by a turbine rotation speed sensor 54, a signal representing rotation speed of the input shaft 36 (input shaft rotation speed) $N_{IN}$ which is equal to the input rotation speed of the continuously variable transmission apparatus 18 and being detected by an input shaft rotation speed sensor 56, and a vehicle speed signal representing a vehicle speed V corresponding to rotation speed of the output shaft 44 (output shaft rotation speed) $N_{OUT}$ which is the output rotation speed of the continuously variable transmission apparatus 18 detected by a vehicle speed sensor (output shaft rotation speed sensor) 58.

Also inputted are a throttle valve open-degree signal representing a throttle valve open-degree $θ_{TH}$ of an electronic throttle valve 30 provided in an inlet pipe 32 (refer to FIG. 1) of the engine 12 and being detected by a throttle sensor 60, a signal representing a cooling water temperature $T_W$ of the engine 12 detected by a cooling water sensor 62, a signal representing an oil temperature $T_{CVT}$ in the hydraulic circuit of the continuously variable transmission apparatus 18 and being detected by a CVT oil temperature sensor 64, and an accelerator open-degree signal representing an accelerator operation amount (accelerator open-degree) which corresponds to a depressed amount of an accelerator pedal 68 and being detected by an accelerator open-degree detection sensor 66.

Also inputted are a foot brake operation signal representing presence/absence of operation of the foot brake $B_{ON}$ which is an usually using brake and being detected by a foot brake switch 70, and an operation position signal representing a lever position (operation position) of the shift lever 74 $P_{SH}$ and being detected by a lever position sensor 72, and an electric charge/discharge current signal representing an electric charge/discharge current (input/output current) $I_{CD}$ of a battery (not shown) and being detected by a current sensor 76. Further inputted are a battery temperature signal representing a battery temperature $B_T$ detected by a battery temperature sensor 78, a battery voltage signal representing a battery voltage $V_{BAT}$, and a signal representing a on-state $AC_{ON}$ of an air-conditioning switch 80 for operating the compressor of the air-conditioner.

Also inputted are a room temperature signal representing temperature $T_R$ of a vehicle cabin or compartment detected by an indoor sensor 82, a signal representing an on-state $C_{ON}$ of a main switch of a cruise control switch 84 operated for allowing the vehicle to run under a cruise control i.e., an automatic vehicle speed control regardless of the accelerator operation amount $A_{CC}$, a vehicle speed set signal representing on-operation $C_{SET}$ of a vehicle speed set switch of the cruise control switch 84, and a cancel signal representing an on-state $C_{CAN}$ of a release switch of the cruise control switch 84.

On the other hand, following signals are outputted from the electronic controlling apparatus 50. In detail, engine output control command signals $S_E$ for controlling output of the engine 12 is outputted, which includes a throttle signal for driving a throttle actuator 86 controlling open/close of the electronic throttle valve 30, an injection signal for controlling an amount of fuel injected from a fuel injection device 88, and an ignition timing signal for controlling a timing of ignition of fuel air mixture by an ignition device 90.

Also outputted are a speed-change control command signal $S_T$ for changing the speed-change ratio γ of the continuously variable transmission apparatus 18, which includes a command signal for controlling the speed-change control pressure $P_{RATIO}$, and a nip force control command signal $S_B$ for adjusting the nip force of the transmitting belt 48 such as a command signal for controlling the nipping force control pressure $P_{BELT}$.

Further outputted is a lockup control command signal for controlling the engagement, release and slipped amount of the lockup clutch 26 such as a command signal for driving both a linear solenoid valve adjusting and a on-off solenoid (not shown) provided within the hydraulic controlling circuit 100, and a linear solenoid adjusting a torque capacity of the lockup clutch 26. Incidentally, a command signal for driving a linear solenoid (not shown) controlling a line hydraulic pressure $P_L$ may be outputted to the hydraulic controlling circuit 100. This line hydraulic pressure $P_L$ is adjusted by the hydraulic controlling circuit 100 using a hydraulic pressure generated at the mechanical oil pump 28 driven by the engine 12.

For example, the relief-type pressure adjusting valve i.e, regulator valve (not shown) provided within the hydraulic controlling circuit 100 can adjust the line hydraulic pressure $P_L$, depending on the engine load and the like represented by the accelerator open-degree or the throttle open-degree. A shift lever 74 shown in FIGS. 2 and 3 is disposed for example in the vicinity of a drivers' seat to be shifted by the driver manually to one of five lever positions including "P", "R", "N", "D" and "L".

When the shift lever 74 is shifted to "P" position (range) corresponding to a parking position, the power transmitting route of the driving device for vehicle is released, that is, the driving apparatus for vehicle is brought into a neutral state to interrupt the power transmission. In this state, a mechanical parking mechanism can operate to mechanically lock rotation of the output shaft 44. When the shift lever 74 is shifted to the "R" position (range) corresponding to a rearward running position, the output shaft 44 rotates reversely to transmit the driving force for the rearward running of the vehicle, and it is shifted to the "N" position (range) corresponding to a neutral position, to interrupt the power transmission through the driving apparatus for vehicle 10. When the shift lever 74 is shifted to the "D" position (range) corresponding to a forward running position, the continuously variable transmission apparatus 18 is allowed to perform the speed-change. That is, the automatic speed-change mode is establishes for performing the automatic speed control. The shift lever 74 is shifted to the "L" position corresponding to an engine brake position, when a strong engine brake is required.

The cruise control switch 84 disposed for example in the vicinity of a steering wheel includes following switches. They are a main switch for determining on/off of the cruise control, a vehicle speed set switch for setting the vehicle speed upon operation of the cruise control, an accelerator switch for renewing the set vehicle speed to a speed increase side, and a release switch for outputting a cancel signal to release the operation of cruise control.

Figure 3:
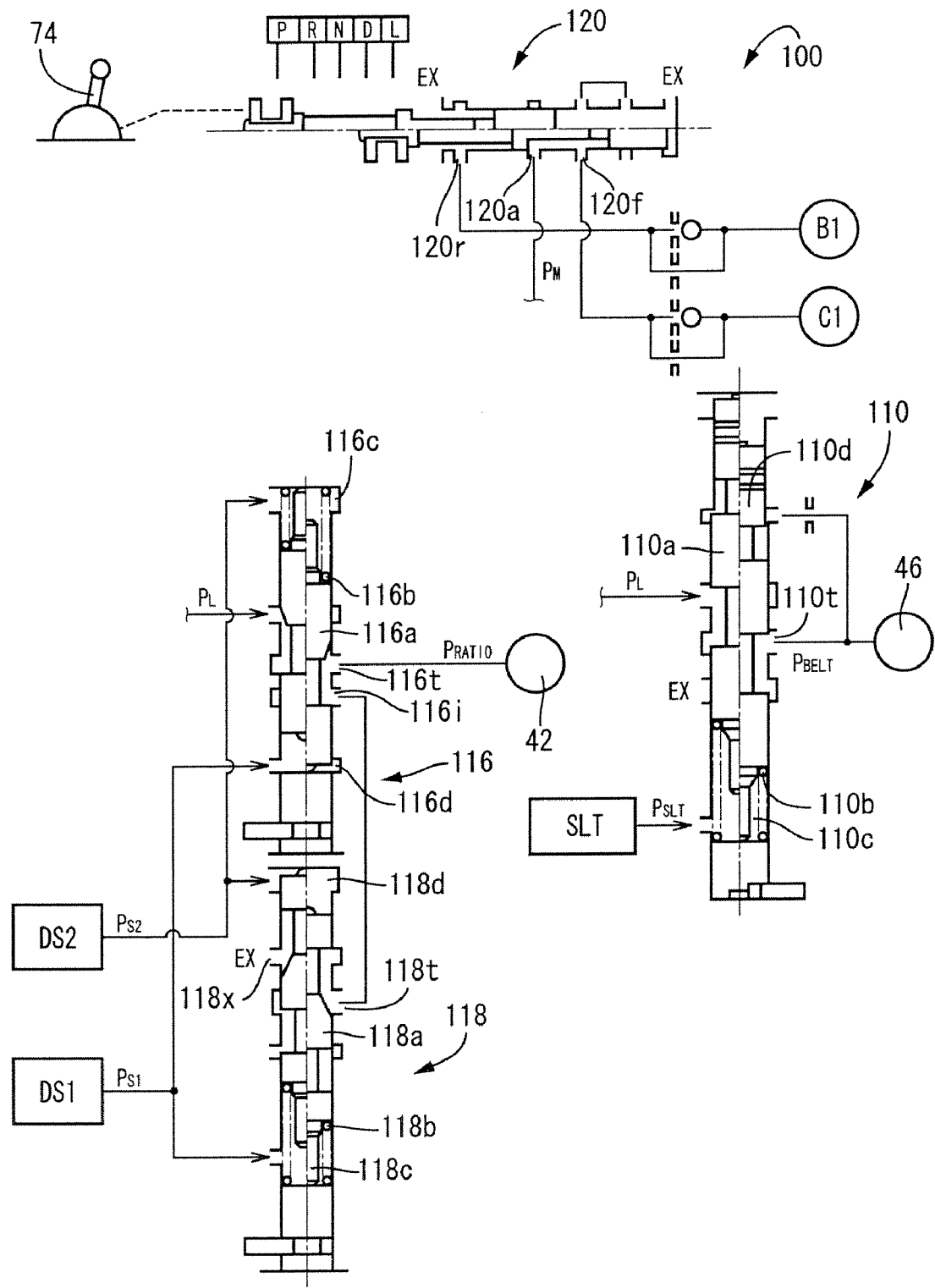
FIG. 3 is a partial hydraulic circuit of a hydraulic circuit relating to a hydraulic control for engagement of a clutch for forward running and a brake for rearward running, resulted from a belt nip force control, speed-change ratio control, and shift operation of a shift lever.

FIG. 3 shows a main part of the hydraulic controlling circuit 100 relating to the nip pressure control of the continuously variable transmission 18, the speed-change ratio control, and the hydraulic pressure control for engagement of the clutch of forward running C1 and the brake B1 for rearward running both resulted from shifting operation of the shift lever 74. This main part includes a nip force control valve 110, a speed-change control valve UP 116 and a speed-change control valve DN118, and a manual valve 120. The nip force control valve 110 adjusts a nip force control pressure $P_{BELT}$ which is the hydraulic pressure of the output side hydraulic cylinder 46c of the radius variable pulley 46 such that the transmitting belt 48 does not slip relative to the radius variable pulleys 42 and 46. The speed-change control valve UP 116 and the speed-change control valve DN118 adjust the speed-change pressure $P_{RATIO}$ which is the hydraulic pressure of the input side hydraulic cylinder 42c of the radius variable pulley 42 such that the speed-change ratio γ changes continuously. The manual valve 120 is switched in accordance with the shift operation of the shift lever 74 to switch the oil path mechanically, so that the clutch C1 for forward running and the brake B1 for rearward running are engaged or released respectively.

The manual valve 120 has an input port 120a, an output port for forward running 120f, and an output port for rearward running 120r. A modulate pressure $P_M$ of constant value which is adjusted based on the line hydraulic pressure $P_L$ as the original pressure by a modulate valve (not shown) is supplied to the input port 120a That is, the operating oil of which pressure is adjusted in the modulate pressure $P_M$ by the modulate valve is supplied.

With shifting the shift lever 74 to the "D" position or the "L" position, the oil path of the manual valve 120 is switched for engagement of the clutch C1 for forward running and for release of the brake B1 for rearward running. Specifically, the modulate pressure $P_M$ is supplied to the clutch C1 for forward running, as the output pressure for forward running, via the output port for forward running 120f The operating oil in the brake B1 for rearward running is discharged from the output port for rearward running 120r is discharged via a discharge port EX to an atmosphere. Thus, the clutch C1 for forward running is engaged and the brake B1 for rearward running is released.

With shifting the shift lever 74 to the "R" position, the oil path of the manual valve 120 is switched for engagement of the brake B1 for rearward running and for release of the clutch C1 for forward running. Specifically, the modulate pressure $P_M$ is supplied to the brake B1 for rearward running, as the output pressure for rearward running, via the output port for rearward running 120r. The operating oil in the clutch C1 for forward running is discharged from the output port for forward running 120f via a discharge port EX to the atmosphere. Thus, the brake B1 for rearward running is engaged and the clutch C1 for forward running is released.

With shifting the shift lever 74 to the "P" position of the "N" position, the manual valve 120 is switched for release of both the clutch C1 for forward running and for the brake B1 for rearward running. Specifically, both the oil path extending from the input port 120a to the output port for forward running 120f and the oil path extending from the input path 120a to the output port for rearward running 120r are interrupted. The operating oil in both the clutch C1 for forward running and the brake B1 for rearward running is discharged from the manual valve 120. Thus, both the clutch C1 for forward running and the brake B1 for rearward running are released.

The speed-change ratio control valve UP 116 has a spool 116a, a spring 116b, an oil chamber 116c and an oil chamber 116d. The spool 116a disposed in a case (not shown) to be shiftable in an axial direction (up-down direction in FIG. 3) to open/close an input/output port 116t and an input/output port 116i. To the input/output port 116t, the radius variable pulley 42 is operably connected. The spring 116b as a bias means biases the spool 116a in a direction so that the input/output port 116t and the input/output port 116i are communicated with each other.

The oil chamber 116c contains the spring 116b therein and receives a control hydraulic pressure $P_{S2}$ which is an output hydraulic pressure of a solenoid valve DS2. This solenoid valve DS2 is duty-controlled by the electronic controlling apparatus 50 to apply a propel force to the spool 116a for communicating the input/output port 116t and the input/output port 116i with each other. The oil chamber 116d receives a control hydraulic pressure $P_{S1}$ which is an output hydraulic pressure of a solenoid valve DS1. This solenoid valve DS1 is duty-controlled by the electronic controlling apparatus 50 to apply a propel force to the spool 11 6a for closing the input/output port 11 6i.

The speed-change ratio control valve DN 118 has a spool 118a, a spring 118b, an oil chamber 118c and an oil chamber 118d. The spool 118a disposed in the case to be shiftable in an axial direction to open/close an input/output port 118t. The spring 118b as a bias means biases the spool 118a toward valve close direction. The oil chamber 118c contains the spring 118b therein and receives the control hydraulic pressure $P_{S1}$ which is the output hydraulic pressure of the solenoid valve DS1 duty-controlled by the electronic controlling apparatus 50 to apply a propel force to the spool 118a toward a valve close direction. The oil chamber 118d receives the control hydraulic pressure $P_{S2}$ which is the output hydraulic pressure of the solenoid valve DS2 duty-controlled by the electronic controlling apparatus 50 to apply a propel force toward the valve open direction. As apparent, the control hydraulic pressure $P_{S2}$ is supplied to both the oil chambers 116c and 118c, while the control hydraulic pressure $P_{S1}$ is supplied to both the oil chambers 116d and 118d.

The solenoid valve DS1 outputs the control hydraulic pressure $P_{S1}$ to the input side radius variable pulley at input side 42 to narrow width of the V-shaped groove for up-shifting. In detail, the solenoid valve DS1 supplies the operation oil to the input side hydraulic cylinder 42c to increase the hydraulic pressure ($P_{RATIO}$) for narrowing distance between the rotary bodies 42a and 42b, so that the effective radius increases to make the speed-change ratio γ small. To the contrary, the solenoid valve DS2 outputs the control hydraulic pressure $P_{S2}$ to the input side radius variable pulley 42 to widen width of the V-shaped groove for down-shifting. In detail, the solenoid valve DS2 discharges the operation oil from the input side hydraulic cylinder 42c to decrease the hydraulic pressure ($P_{RATIO}$) for widening distance between the rotary bodies 42a and 42b, so that the effective radius decreases to make the speed-change ratio γ large.

Specifically, in FIGS. 1 and 3, when the control hydraulic pressure $P_{S1}$ is outputted, the line hydraulic pressure $P_L$ inputted into the speed-change control valve UP 116 is supplied to the input side hydraulic cylinder 42c to control the speed-change pressure $P_{RATIO}$ continuously. When the control hydraulic pressure $P_{S2}$ is outputted, the operation oil in the input side hydraulic cylinder 42c is discharged via the input/output port 116t, the input/output port 116i and the input/output port 118t, from the discharge port 118x, to control the speed-change pressure $P_{RATIO}$ continuously.

For example, the speed-change of the continuously variable transmission 18 is performed, corresponding to of rotation speed difference (deviation) $\Delta N_{IN}$ between an input shaft target rotation speed i.e, a target rotation speed $N_{IN}^*$ (or transitional target rotation speed $N_{INP}^*$) to be fully described later and an input shaft actual rotation speed i.e., an actual rotation speed $N_{IN}$ to be described fully later, that is $\Delta N_{IN}(=N_{IN}^*$ (or $N_{INP}^*)-N_{IN}$), so that input shaft target rotation speed and the input shaft actual rotation speed are coincided with each other. Here, "the input shaft target rotation speed" means a target rotation speed of the input shaft 36, while the "input shaft actual rotation speed" means an actual rotation speed of the input shaft 36. Thus, supply and discharge of the operation oil to and from the input side hydraulic cylinder 42c adjust the speed-change control pressure $P_{RATIO}$ to change the speed-change ratio γ continuously.

The nip pressure control valve 110 has a spool 110a, a spring 110b, an oil chamber 110c and a feed back oil chamber 110d. The spool 110a disposed in a case (not shown) to be shiftable in an axial direction (up-down direction in FIG. 3) to open/close an input/output port 110t to which the radius variable pulley 46 is operably connected. The spring 110b as a bias means biases the spool 110a toward a valve open direction. The oil chamber 110c contains the spring 110b therein and receives a control hydraulic pressure $P_{SLT}$ which is an output hydraulic pressure of a linear solenoid valve $S_{LT}$ duty-controlled by the electronic controlling apparatus 50 to apply a propel force to the spool 116a toward the valve open direction.

The feedback oil chamber 110d receives a nip force control hydraulic pressure $P_{BELT}$ outputted to apply a propel force to the spool 110a toward a valve close direction. Thus, the nip force control valve 110, using the control hydraulic pressure $P_{SLT}$ from the linear solenoid valve SLT as the pilot pressure, pressure-controls the line hydraulic pressure $P_L$ continuously, to thereby output the nip force control pressure $P_{BELT}$ for the radius variable pulley 46. For example, the nip force control pressure $P_{BELT}$ of the input side hydraulic cylinder 46c is pressure-controlled to obtain a required hydraulic pressure $P_{BELT}^*$ to be fully described later. The belt nip force i.e., the friction force among the radius variable pulleys 42 and 46 and the transmitting belt 48 is increased/decreased, corresponding to this nip force control pressure $P_{BELT}$.

Figure 4:
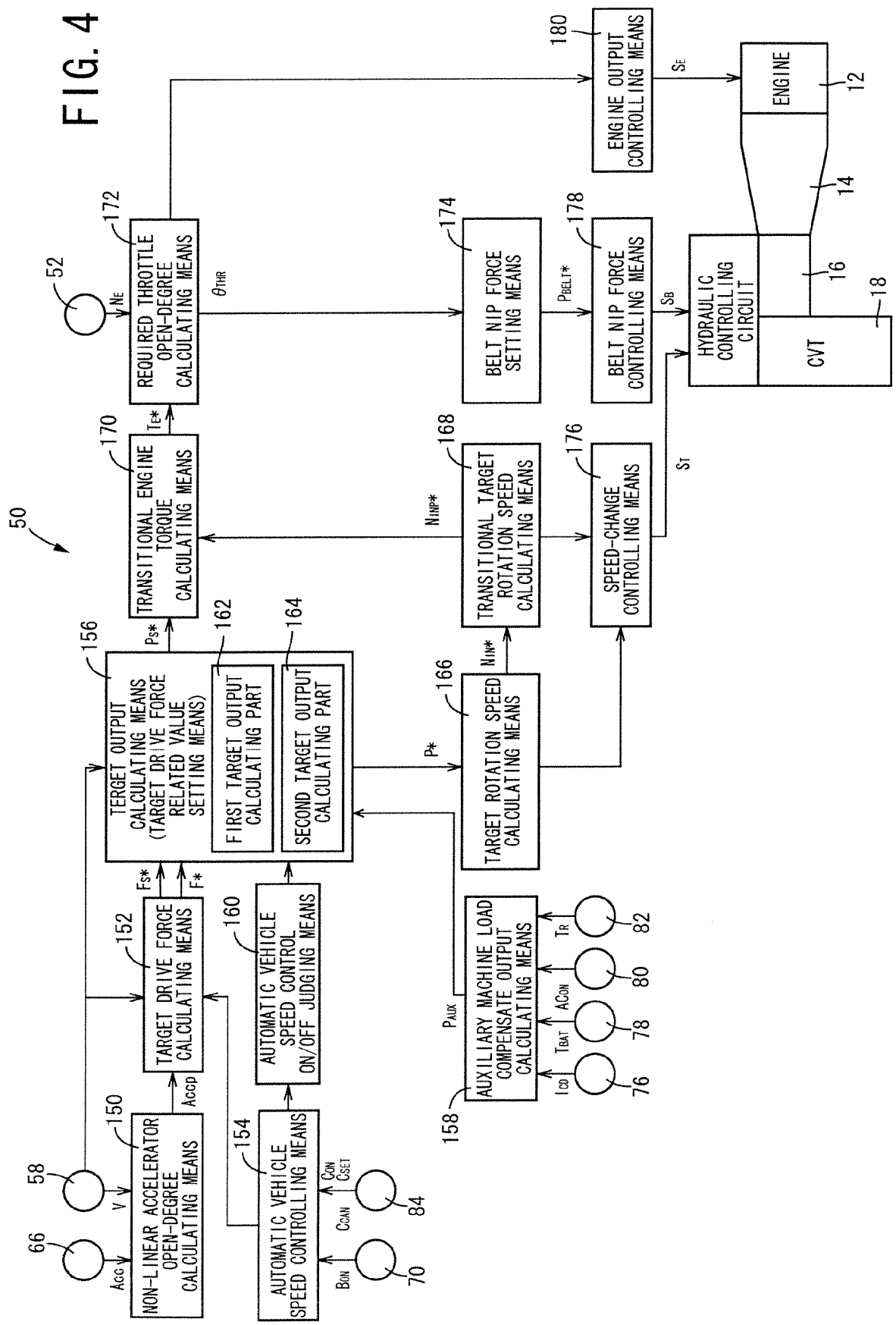
FIG. 4 is a function block diagram explaining a main part of a control function of an electronic controlling apparatus show in FIG. 2.

FIG. 4 is a functional block diagram for explaining a main part of the control function by the electronic controlling apparatus 50 (refer to FIG. 2). That is, relation among various sensors 52, 54 - - - for detecting the vehicle running condition, various calculating means 150,152 - - - for calculating the commands based on the detected signals, and the engine 12 and the hydraulic pressure controlling circuit 100 etc. to be operated in accordance with the commands is shown.

Figure 5:
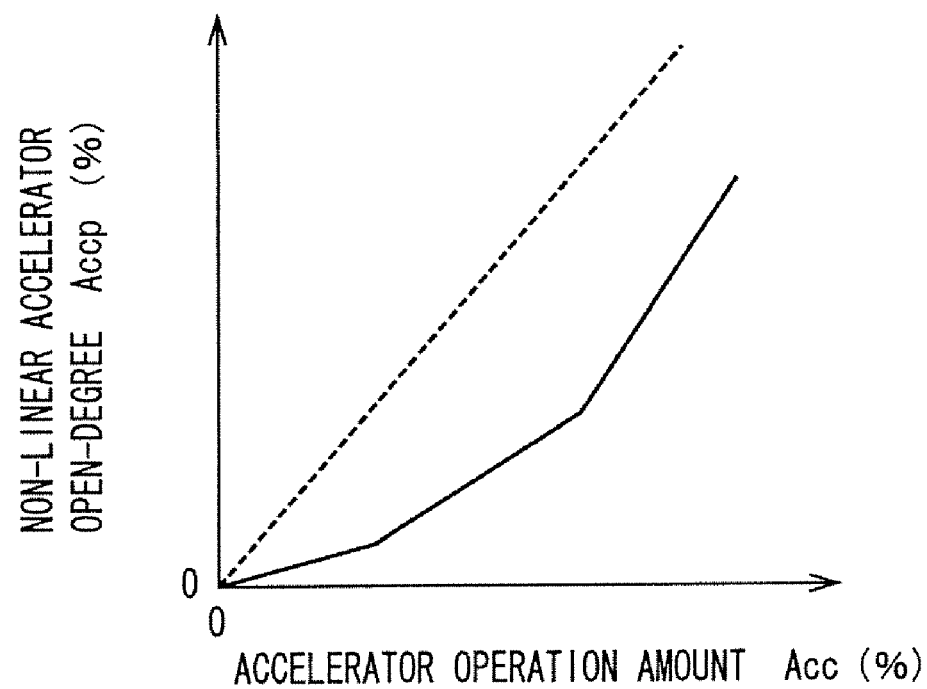
FIG. 5 is a view showing an example of a relation (map, non-linear map) between an accelerator operation amount and the non-linear accelerator open-degree calculated experimentally and stored in advance.

In FIG. 4, a non-linear accelerator open-degree calculate means 150, to which signals X and Acc are inputted from a vehicle speed sensor 58 and an accelerator open-degree sensor 66, calculates a non-linear accelerator open-degree Accp (=map (accelerator operation amount Acc)) based on an actual accelerator operation amount Acc. Upon the calculation, a relation (map, non-linear map) shown by a solid line in FIG. 5 is used, which is the non-linear map exhibiting the relation between the accelerator operation amount Acc and the non-linear accelerator open-degree Accp calculated through an experiment and stored in advance.

Figure 6:
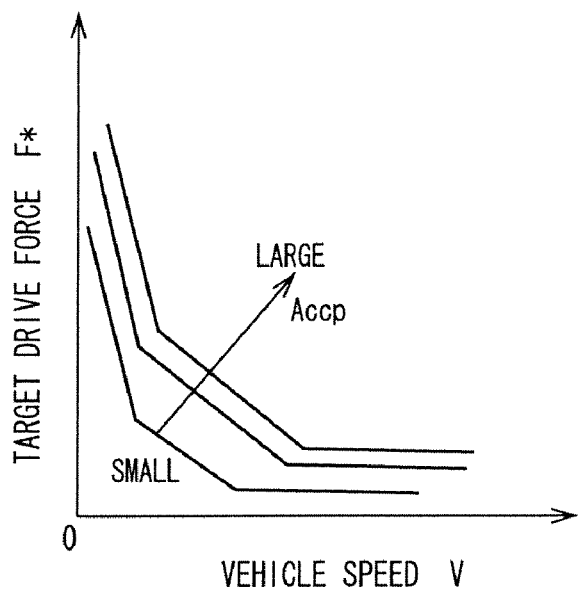
FIG. 6 is a view showing an example of a relation (map, drive force map) between a vehicle speed and a target drive force with a non-linear accelerator open-degree being a parameter experimentally calculated and stored in advance.

This non-linear map is an example of a function which is interpolated to calculate the non-linear accelerator open-degree with the accelerator operation amount being a variable so that an angle of the accelerator pedal depressed by the driver and a sensitive angle coincide with each other. Instead for such single non-linear map, plural kinds of non-linear maps using the vehicle speed as the variable may be set in advance. Incidentally, a broken line in FIG. 5 shows a one to one relation between the accelerator operation amount Acc and the non-linear accelerator open-degree Accp which is not interpolated, just for reference To a target drive force calculating means 152, signals are inputted from the vehicle sensor 58, the non-linear accelerator open-degree calculating means 150 and an automatic vehicle speed controlling means 154. The target drive force calculating means 152 has some functions as fully explained later, one of which is calculation of a target drive force F* based on the accelerator operation amount Acc as a required accelerator amount. For example, the target drive force calculating means 152 calculates the target drive force F*(=map, non-linear accelerator open-degree Accp) based on an actual vehicle speed and the non-linear accelerator open-degree Accp calculated by the non-linear accelerator open-degree calculating means 150. Upon the calculation, a relation (map, drive force map) shown in FIG. 6 is used, which is the map exhibiting relation between the vehicle speed V and the target drive force F* with the non-linear acceleration open degree being the variable, which is calculated experimentally and stored in advance. In the map shown in FIG. 6, the target drive force F* is set large for the small vehicle speed V and for the large non-linear accelerator open-degree Accp.

Figure 7:
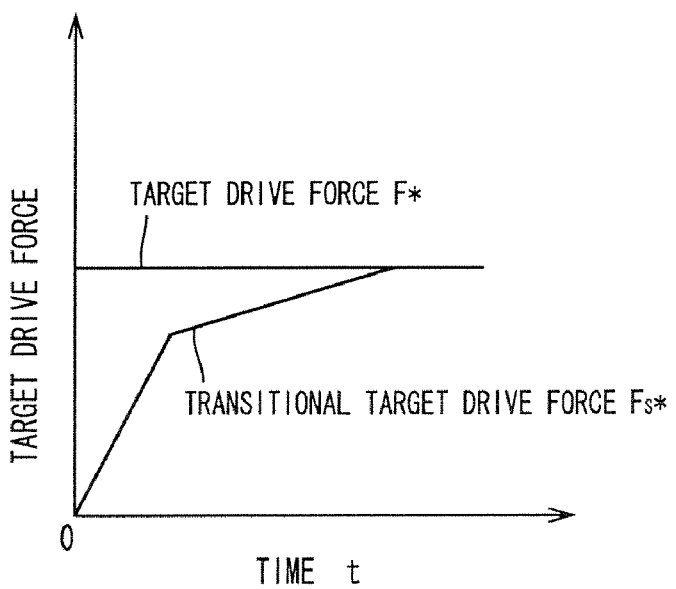
FIG. 7 is a view showing an example of a transitional property of a transitional target drive force set by a target drive force calculating means to increase toward the target drive force.

Also, the target drive force calculating means 152 calculates, based on the calculated target drive force F*, a transitional target drive force $F_S^*$ which increases gradually toward the target drive force F* as lapse of time t, as shown in FIG. 7. The transitional property shown in FIG. 7 may be uniformly determined in advance relative to the target drive force F* so that the drive force changes within the speed not causing the shock or delay of response. Alternatively, it can be changed based on the parameter such as the accelerator operation amount Acc or changed amount thereof ΔAcc, or the vehicle speed. In this case, the transitional property is set to rise earlier as the accelerator change amount becomes large. When the vehicle runs based on depression of the accelerator pedal 68 in this way, the target drive force calculating means 152, using the drive force map, calculates the target drive force F* based on the accelerator open-degree Acc and the like.

To the contrary, when the vehicle is running under the cruise control in which the target vehicle speed V* determined in advance is set regardless of the accelerator operation amount Acc, the target drive force F* can not be calculated based on the accelerator operation amount Acc. Manner how to calculate the target drive force F* under the cruise control will be explained in the following. The cruise control is performed by an automatic vehicle speed controlling means 154, in which the vehicle speed V is automatically controlled in the target vehicle speed set in advance, regardless of the accelerator operation amount Acc. For example, when on state $C_{ON}$ signal resulted from a main switch operation of the cruise control switch 84 is inputted during the vehicle running, the automatic vehicle speed controlling means 154 memorizes, based on a signal output of on operation $C_{SET}$ of the vehicle speed set switch, an actual vehicle speed V at this time as the set vehicle speed i.e., the target vehicle speed V*, and starts the cruise control.

At the same time, the automatic vehicle speed controlling means 154 outputs the command to the target drive force calculating means 152 for calculation of the target drive force F* thereat to realize the target vehicle speed V*. In this way, the vehicle speed V is kept in the target vehicle speed V*, regardless of the accelerator operation amount Acc. Incidentally, cancel of the cruise control will be explained later.

The target drive force calculating means 152 calculates, during automatic vehicle speed control (cruise control) by the automatic vehicle speed controlling means 154, the target drive force F* based on the target vehicle speed set by the automatic vehicle speed controlling means 154, and some vehicle running conditions such as a vehicle inclination θ upon an ascent or a descent running.

For example, the target drive force calculating means 152 calculates a running resistance "fres" upon a flat running. This fres can be expressed by sum of a rolling resistance Rr and an air resistance Ra (fres=Rr+Ra). Here, the rolling resistance Rr is expressed by product of a rolling resistance coefficient μr and a vehicle weight W (Rr=μr×W), while the air resistance Ra is expressed by product of an air resistance coefficient, a forwardly projected area A and the vehicle speed V (μa×A×V²). For example, the running resistance fres is calculated, using a relation (map) between the "fres" and the vehicle speed calculated experimentally and stored in advance, based on the vehicle speed V.

Figure 8:
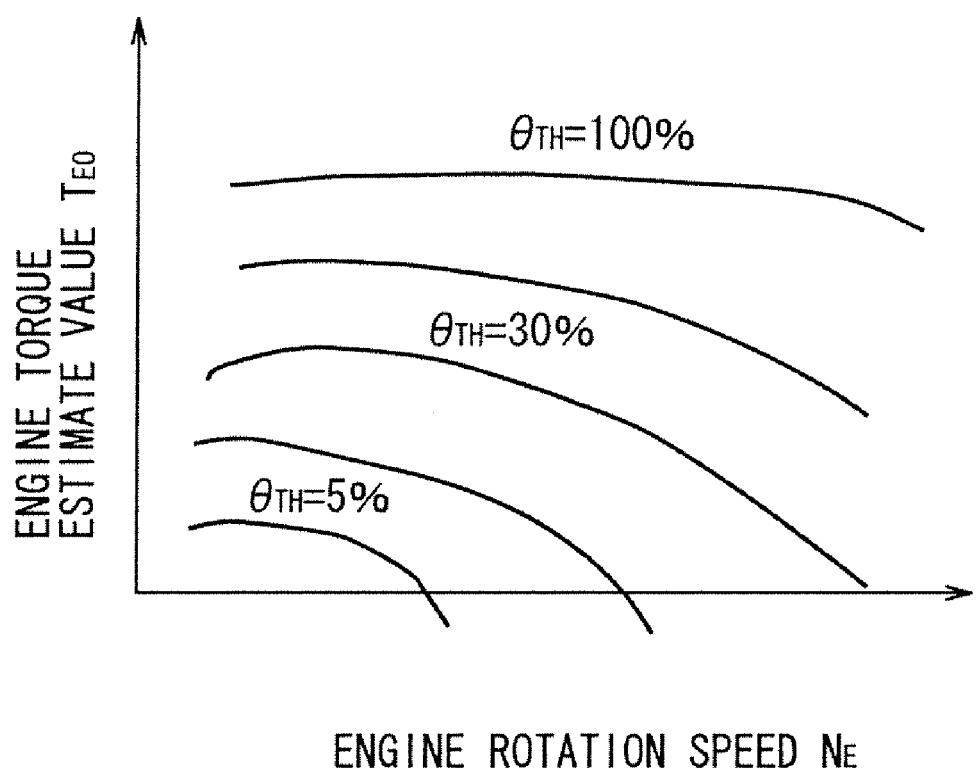
FIG. 8 is a view showing an example of a relation (engine torque map) between an engine rotation speed and an engine torque estimate value with a throttle open-degree being a parameter experimentally calculated and stored in advance.

Next, the target drive force calculating means 152 calculates an engine torque estimate value $T_{EO}$ based on a map shown in FIG. 8, and then calculates a presently occurred drive force Freal. In detail, the map (engine torque map) FIG. 8 shows a relation between the engine rotation speed $N_E$ and the engine torque estimate value $T_{EO}$ with the throttle open-degree $θ_{TH}$ being the variable, which is calculated experimentally and stored in advance. Using this map, the running engine torque estimate value $N_{EO}$ is calculated based on the actual engine rotation speed $N_E$ and the throttle valve open-degree $θ_{TH}$.

Then, based on the estimated engine torque $T_{EO}$, actual speed-change ratio γ of the continuously variable transmission 18, a reduction ration i of the differential gear unit 22 and a tire effective radius $r_w$ of the driving wheel 24, the presently occurred drive force Freal (=$T_{EO}$×γ×i/$r_w$) is calculated.

Next, the target drive force calculating means 152 calculates a standard vehicle acceleration Gb based on the presently occurred drive force Freal, the running resistance fres, the vehicle weight W, and an equivalent inertia mass Wr. Here, the standard vehicle acceleration Gb means the vehicle acceleration G which should be generated by the occurred drive force fres upon the flat running of the vehicle. The equivalent inertia mass Wr corresponds to an inertia weight of rotary parts obtained by replacing the inertia moment of the engine 12, a power transmitting system and the like to a weight on an effective diameter of the drive shaft, which is experimentally calculated and stored in advance.

Next, the target drive force calculating means 152 calculates an acceleration difference G' between the standard vehicle acceleration Gb and the actual vehicle acceleration Gs(G'=Gb−Gs). Using a relation (map) showing a relation between the vehicle speed V and an artificial road surface gradient $θ_A$, with the acceleration difference G' being the parameter, which is calculated experimentally and stored in advance, the artificial road surface gradient $θ_A$ is calculated based on the calculated acceleration difference G' and the vehicle speed V. This acceleration difference G', comparing the actual vehicle acceleration Gs with the standard vehicle acceleration Gb, represents a magnitude of the road surface gradient θ where the vehicle is actually running. For this reason, as this acceleration difference G' becomes large, the road surface gradient θ becomes large. The superficial road surface gradient $θ_A$ includes, in addition to the actual road surface gradient where the vehicle is actually running, a gradient part obtained by replacing for example weight of pulling trailer which is the weight other than the actual vehicle weight.

Then, the target drive force calculating means 152 calculates, based on the vehicle weight W, the superficial road surface gradient $θ_A$ and the running resistance fres, the target drive force F* represented by F*=K×f(W, $θ_A$)+fres. Here, K is a predetermined coefficient calculated experimentally an stored in advance, and f(W, $θ_A$) is a map or a function calculated experimentally and stored in advance.

The above mentioned cruise control by the automatic vehicle speed controlling means 154 is released in the following cases. The released cases are, a signal input of on-operation $C_{CAN}$ of the release switch of the cruise control switch 84, absence of signal input of on-state $C_{ON}$ resulted from off operation of the main switch, or an input of on-signal $B_{ON}$ of the brake on switch resulted from depression of the foot baking pedal. In this case, control by the non-linear acceleration open-degree calculating means 150 is performed.

A target output calculating means 156 calculates a transitional target output PS* and a target output P* as the target drive force related values as below. Firstly, the target output calculating means 156 calculates, based on the transitional target drive force $F_s^*$ calculated by the target drive force calculating means 152 and the vehicle speed V, a transitional target output $P_s^*$ as a target drive force related value, in accordance with an equation of $P_s^*=f(F_s^*, V)=F_s^* \times V \times 1000/3600$.

Secondary, the target output calculating means 156 calculates, based on the target drive force F* calculated by the target drive force calculating means 152, the vehicle speed V and an auxiliary machine load compensate output $P_{AUX}$ the target output P* as the target drive force related value, using an equation of $P^*=f(F^*, V)=F^* \times V \times 1000/3600+P_{AUX}$. Here, the auxiliary machine load compensate output $P_{AUX}$ is based on a load required for the engine 12 which drives an auxiliary machine A (in the following, refer to "auxiliary machine load $A_{UX}$"), and the auxiliary machine load $A_{UX}$ is calculated at the auxiliary machine load compensate output calculating means 158. The auxiliary machine load compensate output $P_{AUX}$ corresponds to an increased part $P^+$ of the engine output $P_E$ required for compensating a decreased output part $P^-$ at the driving wheel 24 caused by the auxiliary machine load $A_{UX}$ that is additional driving of the auxiliary machine A by the engine 12.

An auxiliary machine load compensate output calculating means 158, receiving the signals from current sensor 76, the battery sensor 78, the air-conditioner switch 80 and the indoor sensor 82, calculates following auxiliary machine loads of the auxiliary machines. Firstly, it calculates an auxiliary machine load by the alternator 38, from the relation calculated and stored in advance, based on for example a generating voltage $V_{GEN}$ and a generating current $I_{GEN}$ of the alternator 38. Also, the auxiliary machine load compensate output calculating means 158 calculates an operating capacity $C_{RUN}$ of a compressor 40 of the air-conditioner, from a relation calculated and stored in advance, based on for example an on-state $AC_{ON}$ of an air-conditioner switch and temperature $T_R$ in the vehicle cabin. Then the auxiliary machine load by the compressor 40 of air-conditioner is calculated based on the operated capacity $C_{RUN}$ thus calculated.

Further, the auxiliary machine load output compensating means 158 calculates an auxiliary machine load $A_{UX}$ by summing the auxiliary load of the alternator 38 and that of the compressor of the air-conditioner and to the like, to thereby calculate the auxiliary machine load compensate output $P_{AUX}$ from the predetermined relation based on the auxiliary machine load $A_{UX}$, and is outputted to the target output calculating means 156 as the auxiliary machine load signal.

By the way, when the target output P* is calculated by taking the auxiliary machine load $A_{UX}$ into consideration, it fluctuates depending on fluctuation of the operating condition of the auxiliary machine A, that is, fluctuation of the auxiliary machine load $A_{UX}$. As a result, the target rotation speed $N_{IN}^*$ calculated by an input shaft target rotation speed calculating means i.e., target rotation speed calculating means 166 to be fully explained later based on the target output P* outputted from the target output calculating means 156 also fluctuates depending on fluctuation of the auxiliary machine load $A_{UX}$, to fluctuate the actual input shaft rotation speed accordingly. For this reason, the engine rotation speed changes suddenly during the vehicle regular running in which fluctuation of the input shaft rotation speed $N_{IN}$ is extremely small, for example in the cruise control running in which the vehicle is running in at the constant vehicle speed, whereby the drivability may be worsened.

In view of the above circumstance, in this embodiment, the target output P* is calculated without considering the auxiliary machine load $A_{UX}$ during the vehicle regular running. For this purpose, the equation not including the item of the auxiliary machine load compensating output $P_{AUX}$ is used. An automatic vehicle speed control on/off judging means 160 disposed between the automatic vehicle controlling means 154 and the target output calculating means 156, receives the signal from the automatic vehicle speed controlling means 154 to judge whether the vehicle is running under the automatic vehicle speed control or not. Upon the judgment, presence/absence of command to calculate the target drive force F* for realizing the target vehicle speed V*, output from the automatic vehicle speed controlling means 154 to the target drive force calculating means 152 is considered.

The target output calculating means 156 includes a first target output calculating portion 162 and a second target output calculating portion 164. The first target output calculating portion 162 calculates the first target output $P_1^*$, based on the target drive force F*, the vehicle speed V, and the auxiliary machine load compensate output $P_{AUX}$, in accordance with the equation represented by $P_1^*=f(F^*, V)F^* \times V \times 1000/3600+P_{AUX}$. The second target output calculating portion 164 calculates the second target output $P_2^*$ based on the target drive force F* and the vehicle speed V, in accordance with the equation represented by $P_2^*=f(F^*, V)=F^* \times V \times 1000/3600$.

When the automatic vehicle speed control on/off judging means 160 judges the vehicle regular running i.e., the cruise control by the automatic vehicle speed controlling means 154, the target output calculating means 156 sets the second target output $P_2^*$ as the target output P*. Upon calculation of the second target output $P_2^*$ by the second target output calculating means 164, the target drive force F* calculated by the target drive force calculating means 152 is used for realizing the target vehicle speed V* during the automatic vehicle speed control by the automatic vehicle speed controlling means 154.

In this way, the target output calculating means 156 as the target drive force related value setting means performs following processes. It calculates a first target output $P_1^*$ as a first target drive force related value based on the accelerator operation amount Acc and the auxiliary machine load $A_{UX}$, and a second target output $P_2^*$ as a second target drive force related value without considering the auxiliary machine load $P_{AUX}$ or the change amount thereof.

Also, the target output calculating means 156 sets the second target output $P_2^*$ as the target output P* upon the vehicle regular running i.e., constant speed vehicle running under automatic vehicle speed control (on state) by the automatic vehicle speed controlling means 154. Further, it calculates the second target output $P_2^*$, using the target drive force F* calculated by the target drive force calculating means 152 for realizing the target vehicle speed V*, so that the constant vehicle speed is kept.

Figure 9:
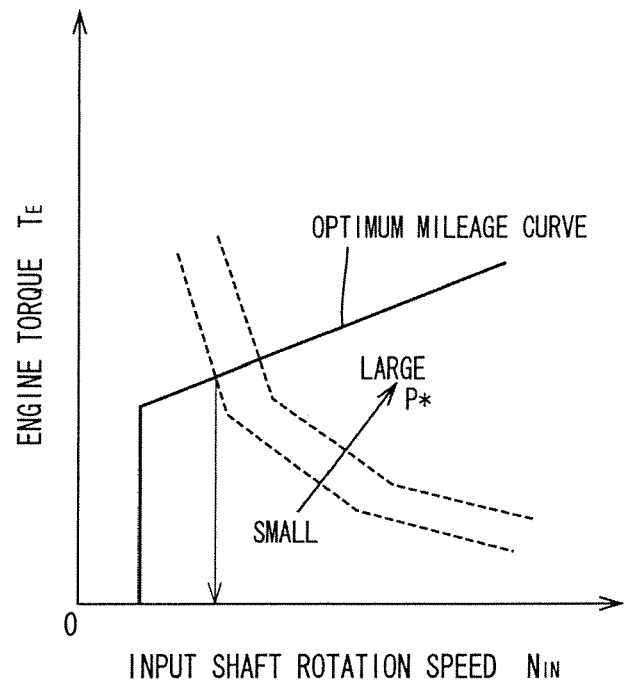
FIG. 9 shows, in a two-dimensional coordinate constructed by an input shaft rotation speed and an engine torque, an example of an optimum mileage curve of the engine and equivalent output curves of the target output, the optimum mileage curve being calculated experimentally and stored in advance to satisfy both a drivability and the mileage, and the equivalent output curves being calculated experimentally and stored in advance based on the input shaft rotation speed and the engine torque.

The target rotation speed calculating means 166 receives the target output P* from the target output calculating means 156 to calculates the target rotation speed $N_{IN}^*$ based thereon. Upon the calculation, the target rotation speed calculating means 166 uses a map shown in FIG. 9 showing two dimensional coordinate in which a vertical axis shows the engine torque $T_E$, while a horizontal axis shows the input shaft rotation speed $N_{IN}$. A solid line is an optimum mileage or fuel consumption line (mileage map, relation) of the engine 12 on which both the drivability and the mileage i.e., the fuel consumption are compatible, and which is calculated experimentally and stored in advance. Broken lines are equivalent output curves (equivalent output map, relation) of the target output P* which are calculated based on the input shaft rotation speed $N_{IN}$ and the engine torque $T_E$ and stored in advance.

The target rotation speed calculating means 166 calculates the target rotation speed $N_{IN}$*(=map (target output P*) based on the target output P* so that the engine 12 is operated along the optimum mileage curve. The target rotation speed $N_{IN}$* is calculated based on the optimum mileage curve and the equivalent output curves to satisfy the target output P*.

Figure 10:
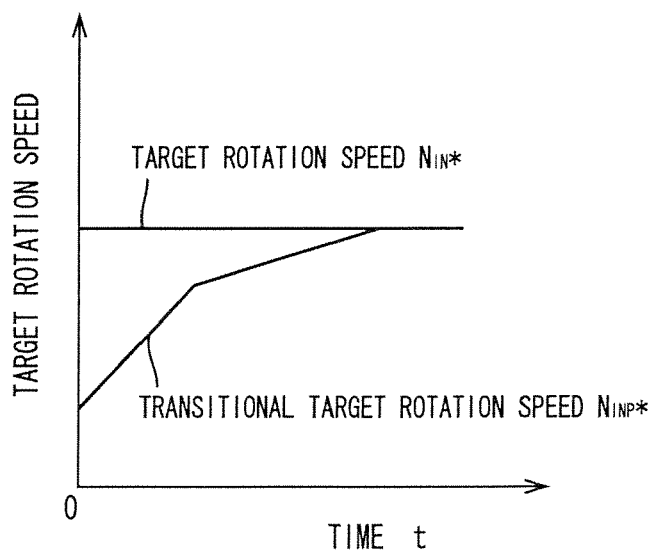
FIG. 10 is a view showing an example of a transitional property of the transitional target rotation speed set by a transitional target rotation speed calculating means to gradually increase toward the target input shaft rotation speed.

The transitional target rotation speed calculating means 168, based on the target rotation speed $N_{IN}$* calculated by the target rotation speed calculating means 166, a transitional target rotation speed $N_{INP}$*. It sets, for example, when the target rotation speed $N_{IN}$* increased stepwise as shown in FIG. 10, the transitional target rotation speed $N_{INP}$* gradually increasing toward the target rotation speed $N_{IN}$*, in accordance with a linear delay function as shown in FIG. 10. The transitional speed-change property shown in FIG. 10 can be set uniformly in advance relative to the target rotation speed $N_{IN}$* so that the speed-change is performed by the speed-change speed not causing the speed-change shock or delay of response. Alternatively, it can be changed depending on the parameter such as the accelerator operation amount Acc or the change amount thereof $\Delta$Acc, or the vehicle speed V. For example, the transitional speed-change property can be set to rise earlier for the larger acceleration change amount $\Delta$Acc.

A speed-change controlling means 176 performs the feed-back control of the continuously variable transmission 18 in accordance with the rotation speed difference (deviation) between the actual input shaft rotation speed $N_{IN}$ and the target rotation speed $N_{IN}$* calculated by the target rotation speed calculating means 166 (or the transitional target rotation speed $N_{INP}$* calculated by the transitional rotation speed calculating means 168), so that the actual rotation speed $N_{IN}$ and the target rotation speed $N_{IN}$*(or the transitional target rotation speed $N_{INP}$*) are coincided with each other. In this way, a speed-change control command signal (hydraulic command) $S_T$ to adjust the speed-change control pressure $P_{RATIO}$ of the input side hydraulic cylinder 42c of the radius variable pulley 42 for widening the V-shape groove width thereof is outputted to the hydraulic controlling circuit 100 to change the speed-change ratio $\gamma$ continuously.

A target engine torque calculating means 170 calculates a target engine torque $T_E$* based on the transitional target output P* calculated by the target output calculating means 156 and the transitional target rotation speed $N_{INP}$* calculated by the transitional target rotation speed calculating means 168. Upon the calculation, the equation represented by $T_E$*=f($P_S$*, $N_{INP}$*)=60×$P_S$*/(2π×$N_{INP}$*) is used.

Figure 11:
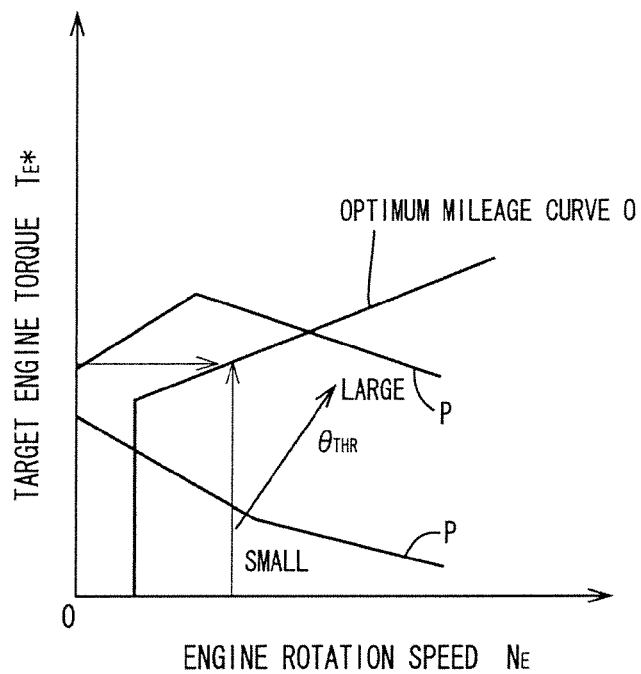
FIG. 11 shows, in a two-dimensional coordinate constructed by an engine rotation speed and a target engine torque, an example of an optimum mileage curve of the engine and equivalent output curves, the optimum mileage curve (mileage curve map, relation) being calculated experimentally and stored in advance to satisfy both a drivability and the mileage, and the equivalent output curves (equivalent output map, relation) being calculated experimentally and stored in advance based on the engine rotation speed and the target engine torque with a required throttle open-degree being a parameter.

A required throttle open-degree calculating means 172 calculates, based on the target engine torque $T_E$* calculated by the target engine torque calculating means 170, a required throttle opened-degree $\theta_{THR}$. Upon the calculation, the required throttle open-degree calculating means 172 uses a map shown in FIG. 11 showing two dimensional coordinate in which a vertical axis shows the target engine torque $T_E$*, while a horizontal axis shows the engine rotation speed $N_E$.

A line O is an optimum mileage or fuel consumption line (mileage map, relation) of the engine 12 on which both the drivability and the mileage i.e., the fuel consumption are compatible, and which is calculated experimentally and stored in advance. Curves P are equivalent output curves (equivalent map, relation) calculated based on the engine rotation speed $N_E$ and the target engine torque $T_E$* with the required throttle open-degree $\theta_{THR}$ being as the variable. The required throttle open-degree $\theta_{THR}$ (=equivalent output map, relation) is calculated based on the target engine torque $T_E$* using the equivalent output curves P so that the engine 12 operates along the optimum mileage line O.

That is, required throttle open-degree calculating means 172 calculates the required throttle open-degree $\theta_{THR}$ to obtain the target engine torque $T_E$* based on the optimum mileage curve and the equivalent output curves. FIG. 11 shows a relation reflecting the engine torque map shown in FIG. 8, and the optimum mileage curve and the equivalent output curves of the target output P* shown in FIG. 9.

Figure 12:
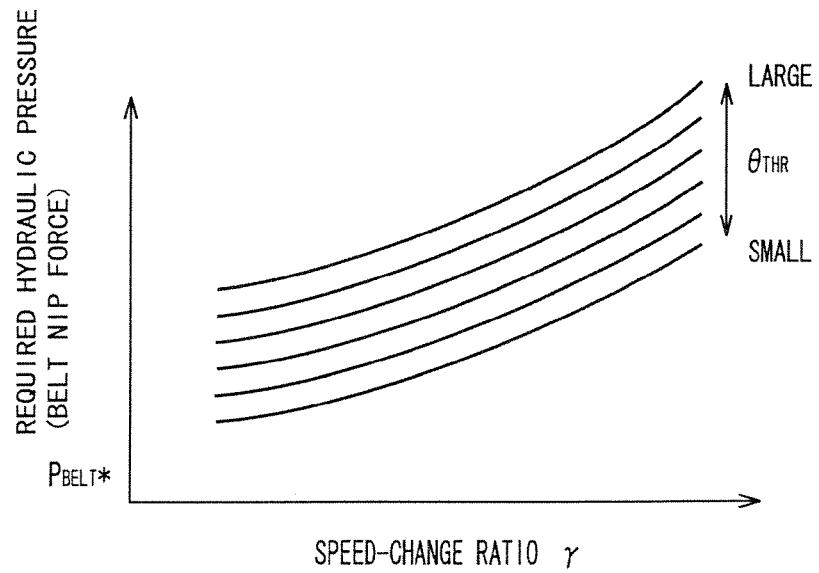
FIG. 12 is an example of a relation (nip force map) between the speed-change ratio and a required hydraulic pressure with the required throttle open-degree being the variable calculated experimentally and stored in advance so that a belt slippage does not occur.

A belt nip force setting means 174, together with a following belt nip force controlling means 178 changes the V-shaped groove width of the radius variable pulley 46 (refer to FIG. 1) That is, the belt nip force setting means 174 calculates, based on the required throttle open-degree $\theta_{THR}$ corresponding to the transmitting torque calculated by the required throttle open-degree calculating means 172, the belt nip force of the transmission belt 48, that is, the required hydraulic pressure $P_{BELT}$ of output side hydraulic cylinder 46c. For example, it sets the required hydraulic pressure $P_{BELT}$* using a relation (nip force map) shown in FIG. 12. This nip force map shows, with the required throttle open-degree being the variable, the relation between the speed-change ratio $\gamma$ and the required hydraulic pressure $P_{BELT}$*(corresponding to the nip force) on which slippage of the transmission belt 48 relative to the radius variable pulleys 42 and 46 does not occur. Thus, the required hydraulic pressure $P_{BELT}$* is set based on the actual speed-change ratio $\gamma$ and the required throttle open-degree $\theta_{THR}$.

A belt nip force controlling means 178 outputs a nip force control command signal $S_B$ to the hydraulic controlling circuit 100 (refer to FIG. 3) for adjusting the nip force control pressure $P_{BELT}$ of the input side hydraulic cylinder 46c of the radius variable pulley 46 so that the required hydraulic pressure $P_{BELT}$* set by the belt nip force setting means 174 is obtained. In this way, the belt nip force is increased/decreased. Upon such adjusting, the hydraulic controlling circuit 100 operates both the solenoid valves DS1 and DS2 such that the continuously variable transmission 18 is speed-changed in accordance with the speed-change control command signal $S_T$ from the speed-change controlling means 176 to thereby control the speed-change control pressure $P_{RATIO}$ of the radius variable pulley 42. Also, it operates the linear solenoid valve SLT so that the belt nip force is increased/decreased in accordance with the nip force control command signal $S_B$ from the nip force controlling means 178 to thereby adjust the nip force control pressure $P_{BELT}$ of the radius variable pulley 46.

Figure 13:
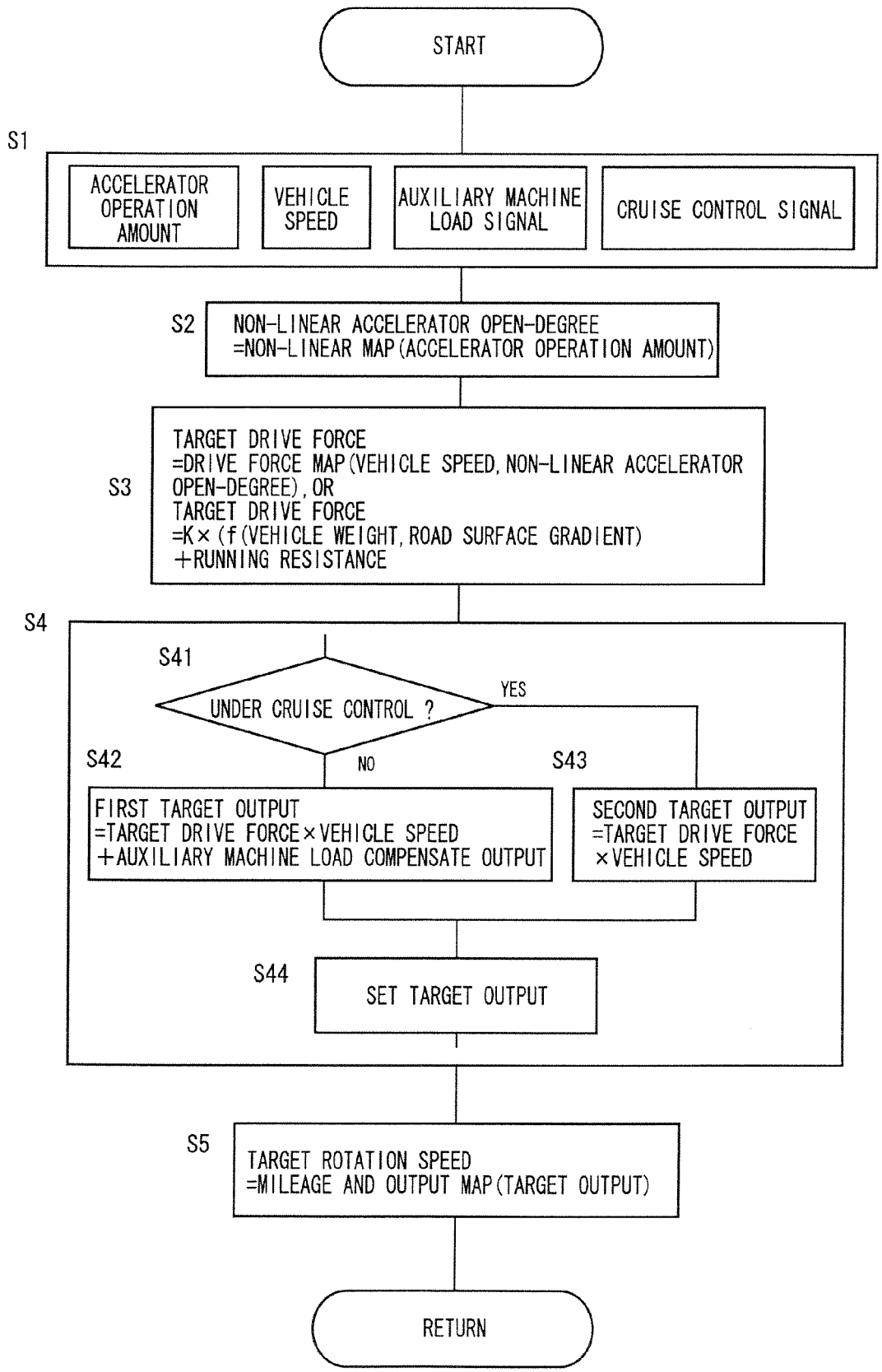
FIG. 13 is a flowchart explaining a main part of the electronic controlling apparatus shown in FIG. 2, i.e., a control operation for setting the target input shaft rotation speed suitably upon the speed-change of the continuously variable transmission.

An engine output controlling means 180 outputs engine output control command signals $S_E$ to the engine 12 to control the output thereof. The engine output control command signals $S_E$ includes for example a throttle signal, an injection signal and an ignition signal respectively outputted to the throttle actuator 86, the fuel injection device 88 and the ignition device 90 (refer to FIG. 2). For example, regarding control of the throttle actuator 86, the engine output controlling means 180 outputs the throttle signal to the actuator 86 to open/close the electronic throttle valve 30 to be brought into the throttle open-degree $\theta_{THR}$ calculated by the required throttle open-degree calculating means 172. In this way, the engine torque $T_E$ is controlled FIG. 13 shows a flow chart for explaining a main part of control operation performed by the electronic controlling apparatus 50, that is, the control for suitably setting the target rotation speed $N_{IN}$* upon the speed-change of the continuously variable transmission 18. This main part of control operation is repeatedly performed by an extremely short cycle such as, for example, few mili seconds to few tens mili seconds.

Firstly, in a step S1 various signals such as the accelerator operation amount Acc, the vehicle speed V, the auxiliary machine load compensate output $P_{AUX}$ as the auxiliary machine load signal, the cruise signal, and the brake operating signal $B_{ON}$ are read into the electronic controlling apparatus 50 (refer to FIG. 2). Here, the on signal $C_{ON}$, the vehicle speed set signal $C_{SET}$ and the cancel signal $C_{CAN}$ are included in the cruise signal.

In a succeeding step S2 corresponding to the above non-linear accelerator open-degree calculating means 150, based on the actual accelerator operation amount Acc, the non-linear accelerator open-degree Accp (=non-linear map (accelerator operation amount Acc)) is calculated. Upon the calculation, the non-linear map shown in FIG. 5 by the solid line is used which exhibits the relation between the accelerator operation amount and the non-linear accelerator open-degree and which is calculated experimentally and stored in advance.

In a succeeding step S3 corresponding to the above target drive force calculating means 152, the drive force map shown in FIG. 6 is used which exhibits the relation between the vehicle speed V and the target drive force F* with the non-linear accelerator open-degree being the parameter, and which is calculated experimentally and stored in advance. Using the drive force map, the target drive force F* upon the accelerator operation (=drive force map (vehicle speed V, non-linear accelerator open-degree Accp)) is calculated.

Alternatively, during the cruise control performed in accordance with the cruise control signal, the target drive force F* upon the cruise control is calculated in accordance with the command for calculating the target drive force F* for realizing the target vehicle speed V*. For example, the target drive force F* upon the cruise control is calculated based on the vehicle weight W, the superficial road surface gradient $\theta_A$ and running resistance fres (F*=K×(f(W, $\theta_A$)+fres).

In a succeeding step S4 including sub steps 41 to 44, the target output P* is calculated based on the target drive force F*. Specifically, in the sub step S41 corresponding to the automatic vehicle speed control on/off judging means 160, fact of the vehicle running under the cruise control is judged by presence/absence of the command output to calculate the target drive force F* for realizing the target vehicle speed V*. In a case the judgment in the sub step S41 being denied, in the sub step S42 corresponding to the target output calculating means 156 (the first target output calculating means 162), the first target output P1* is calculated, based on the target drive force F* upon the accelerator operating, the vehicle speed V and the auxiliary machine load compensate output $P_{AUX}$, in accordance with the equation of P1*=f(F*,V)=F*×V×1000/3600+$P_{AUX}$.

On the other hand, in a case the judgment in the sub step S41 being affirmed, in the sub step S43 corresponding to the target output calculating means 156 (the second target output calculating means 164), the second target output $P_2$* is calculated, based on the target drive force F* upon the cruise control and the vehicle speed V, in accordance with the equation of $P_2$*=f(F*,V)=F*×V×1000/3600.

In the sub step S44 corresponding to the target output calculating means 156, the first target output $P_1$* or the second target output $P_2$* is set as the target output P*. The first target output $P_1$* is set in denial of the sub step S41 judgment which corresponds to the normal running other than the cruise control, while the second output target $P_2$* is set in affirmation of the sub step S41 judgment which corresponds to the cruise control running.

In a succeeding step S5 corresponding to the target rotation speed calculating means 166, from the equivalent output curves of the target output P* shown in FIG. 9 by the broken line and being calculate and stored in advance, the target rotation speed $N_{IN}$* (=optimum mileage curve and the equivalent output curve (target output P*)) is calculated based on the target output P* set in the step S4, so that the engine 12 is operated along the optimum mileage curve as shown in FIG. 9 by the solid line.

As mentioned above, according to this embodiment, in the continuously variable transmission 18 of which speed-change ratio γ is changed so that the actual input rotation speed $N_{IN}$ coincides with the target rotation speed $N_{IN}$* set based on the target output P*, following advantages can be obtained. The first target output $P_1$* is calculated based on the accelerator operation amount Acc and the auxiliary machine load $A_{UX}$ by the target output calculating means 156, and the second target output $P_2$* is calculated without considering the auxiliary machine load $A_{UX}$.

On the other hand, upon the regular running, on account of setting of the second target output $P_2$* as the target output P*, the target output P* does not fluctuate even if the auxiliary machine load $A_{UX}$ fluctuates upon the vehicle regular running, to prevent the target rotation speed from fluctuating. That is, prevention of the unexpected fluctuation of the engine rotation speed increases the vehicle drivability upon the regular running.

In addition, according to this embodiment, upon the vehicle regular running, that is for example the cruise control running in which the vehicle speed is kept in the target vehicle speed V* by the automatic vehicle speed controlling means 154, regardless of the accelerator operation amount Acc, the vehicle drivability is increased. The increased drivability is rendered because the second target output $P_2$* is calculated so that the target vehicle speed V* is kept by the target output calculating means 156 using the target drive force F* upon the cruise control running.

In the following, various modifications of the present invention will be explained. Firstly, regarding consideration of the auxiliary machine load $A_{UX}$, instead of the target output calculating means 156 functioning as the target drive force related value setting means in the above embodiment, the target drive force calculating means 152 can function therefor. That is, the target drive force calculating means 152 functions to calculates the first drive force $F_1$* by taking the auxiliary machine load $A_{UX}$ into consideration, to calculate the second drive force F2* without taking the auxiliary machine load AUX into consideration, and to set the second target drive force $F_2$* as the target drive force F* upon the vehicle regular running.

In this case, the first target drive force $F_1$* has already included the auxiliary machine load $A_{UX}$, so that, even upon the ordinary running which is not the regular running, the target output calculating means 156 can calculate the first target output $P_1$* based on only the first target drive force $F_1$* and the vehicle speed V, without further adding the auxiliary machine load compensate output $P_{AUX}$. Also in this case, similar to the above embodiment, the target output P* does not fluctuate even if the auxiliary machine load $A_{UX}$ fluctuates upon the regular running, to prevent the target input shaft rotation speed from fluctuating whereby the vehicle drivability upon the regular running is increased.

Secondly, regarding the cruise control, in addition to the mode in the above embodiment performed by the automatic vehicle controlling means 154 wherein the constant vehicle speed is kept as the target vehicle speed V*, a modified mode can be employed wherein the automatically controlled vehicle speed, not the constant vehicle speed, is set as the target vehicle speed.

For example, the cruise control running may include an automatic vehicle speed control mode in which the vehicle speed V* is renewed to an increased magnitude by operating an accelerator switch of the cruise control switch 84, and the vehicle speed is automatically controlled to coincide with the renewed increased magnitude, or a so-called radar cruise mode in which the target vehicle speed V* for following-up the vehicle which runs front by a predetermined interval is set, and the vehicle speed is automatically controlled to keep the predetermined interval set. In such cases, the target drive force calculating means 152 calculates for example a target vehicle acceleration represented by an equation of G*=KG× (V*−V) for the target vehicle speed V* to thereby calculate the target drive force F* represented by an equation of F*=m× G. Here, KG is the constant calculated experimentally in advance for earlier realization of the target vehicle speed V*, while m is the load.

In the above embodiment, as the vehicle regular running, the cruise control running by the automatic vehicle speed controlling means 154 is illustrated, in which the target vehicle speed V* is kept regardless of the accelerator operation amount Acc. However, the present invention can be applied to other cruise control mode in which the required load is constant due to substantially constant accelerator operation amount Acc. Incidentally, in the vehicle regular running, the target output calculating means 156 can use, instead of the target drive force F* upon the cruise control, the target drive force F* upon the accelerator operation, to calculate the second target output $P_2^*$. Also in this case, similar to the above embodiment, the target output P* does not fluctuate even if the auxiliary machine load $A_{UX}$ fluctuates in the vehicle regular running, so that prevention of the target rotation speed $P_{IN}^*$ thus realized increases the drivability in the vehicle regular running.

Thirdly regarding the auxiliary machine load $A_{UX}$, in the above embodiment, the generate voltage $V_{GEN}$ and the generate current $I_{GEN}$ of the alternator 38 are used for calculation of the auxiliary machine load $A_{UX}$ at the auxiliary machine load compensate output calculating means 158. However, instead for the generation current $I_{GEN}$ of the alternator 38, electrical loads such as a blower motor for the air-conditioner, a wiper and the like are used. Specifically, on-state $A_{CON}$ of the air-conditioner switch 80, on-state of the wiper operating switch, and an electric charge/discharge current $I_{CD}$ can be used.

In the above embodiment, as the auxiliary machine load, the auxiliary machine load of the alternator 38 and that of the compressor of the air-conditioner 40 are illustrated, and the auxiliary machine load compensate means 158 sums them to calculate the auxiliary machine load $A_{UX}$. However, the auxiliary machine load $A_{UX}$ of the alternator 38 or that $A_{UX}$ of the compressor 40 of the air-conditioner may be employed therefor. In addition, other kinds of the auxiliary machine load such as an auxiliary machine load $A_{UX}$ of a water pump and/or an auxiliary machine load $A_{UX}$ of a steering pump may be employed, in addition to or separately from the auxiliary machine load $A_{UX}$ of the alternator 38 and/or that $A_{UX}$ of the compressor 40 of the air-conditioner.

Fourthly, regarding the automatic vehicle speed control, in the above embodiment, the automatic vehicle speed control on/off judging means 160 judges on/off of the automatic vehicle speed control by the automatic vehicle speed controlling means 154, based on presence/absence of command output for calculating the target drive force F* for realizing with the target vehicle speed V*. However, in addition to the above judging method, other various judging methods can be employed, which are based on the on-signal $C_{ON}$ of the main switch of the cruise control switch 84, a vehicle speed set signal $C_{SET}$ by a vehicle speed set switch of the cruise control switch 84, a cancel signal $C_{CAN}$ by a release switch of the cruise control switch 84 and/or a brake operation signal $B_{ON}$.

Regarding the required value for obtaining the target engine torque $T_E^*$, in addition to the required throttle open-degree $\theta_{THR}$ calculated by the required throttle open-degree calculating means 172 employed in the above embodiment, an injecting amount of the fuel or an igniting timing to the fuel/air mixture can be employed. Also, instead of the input shaft rotation speed $N_{IN}$ and the target rotation speed $N_{IN}^*$ and the transitional target rotation speed $N_{INP}^*$ both relating thereto, an engine rotation speed $N_E$ and a target engine rotation speed $N_E^*$ relating thereto, or a turbine rotation speed $N_T$ and a target turbine rotation speed $N_T^*$ relating thereto can be employed.

In the above embodiment, the torque converter 14 provided with the lockup clutch 26 is employed as the hydrodynamic power transmitting device. However, the lockup converter 26 is not necessarily provided, and other type of the hydrodynamic power transmitting device such as a fluid coupling not having the torque amplifying operation can be employed, instead of the above torque converter 14.

Needless to say, various modifications other than the above mentioned modifications can be employed in accordance with knowledge of the skilled person in this technical field within the gist of the present invention.

What is claimed is:

1. A controlling apparatus for a continuously variable transmission, in which the continuously variable transmission is disposed in a power transmitting route extending from a power source for running driving wheels of a vehicle, and the controlling apparatus sets a target rotation speed of an input shaft of the continuously variable transmission based on a target drive force related value related to a target drive force of the driving wheels, and changes a speed-change ratio so that an actual rotation speed of the input shaft coincides with the target rotation speed thereof, wherein the controlling apparatus includes a target drive force related value setting portion which (i) calculates a first target drive force related value based on both an acceleration required amount and a load of an auxiliary machine driven by the power source for running, (ii) calculates a second target drive force related value without considering the auxiliary machine load, and (iii) sets the second target drive force related value as the drive force related value upon a vehicle regular running, the vehicle regular running includes maintaining a vehicle speed at a target vehicle speed by a speed controlling device.

2. A controlling apparatus for a continuously variable transmission according to claim 1, wherein the controlling apparatus further includes an automatic vehicle speed controlling portion that automatically controls, upon the vehicle regular running, the vehicle speed to coincide with the target vehicle speed set in advance regardless of an accelerator operation amount, and the target drive force related values setting portion receives a controlled result from the automatic vehicle speed controlling portion to calculate the second drive force related value for the target vehicle speed.

3. A controlling apparatus for a continuously variable transmission according to claim 2, wherein the controlling apparatus further includes a target drive force calculating portion that calculates the target drive force, and the target drive force related value setting portion receives a calculated result from the target drive force calculating portion.

4. A controlling apparatus for a continuously variable transmission according to claim 3, wherein calculated results of an accelerator open-degree calculating portion and the automatic vehicle speed controlling portion are inputted into the target drive force calculating portion.

5. A controlling apparatus for a continuously variable transmission according to claim 4, wherein in a vehicle normal running other than the vehicle regular running, the target drive force calculating portion calculates the target drive force upon the vehicle normal running, based on an accelerator open-degree and a vehicle speed both detected by the accelerator open-degree calculating portion.

6. A controlling apparatus for a continuously variable transmission according to claim 4, wherein in the vehicle regular running, the target drive force calculating portion calculates the target force upon the regular running, based on a signal from the automatic vehicle speed controlling portion and a signal corresponding to a vehicle running condition.

7. A controlling apparatus for a continuously variable transmission according to claim 6, wherein between the target drive force related value setting portion and the automatic vehicle speed controlling portion, an automatic vehicle speed control on/off judging portion for judging on/off of the automatic vehicle speed control by the automatic vehicle speed controlling portion is disposed.

8. A controlling apparatus for a continuously variable transmission according to claim 4, wherein the controlling apparatus further includes an auxiliary machine load calculating portion that calculates the auxiliary machine load, and the target drive force related value setting portion receives a calculated result from the auxiliary machine load calculating portion.

9. A controlling apparatus for a continuously variable transmission according to claim 4, wherein the target drive force related value setting portion has a first target output calculating portion that calculates the first target drive force related value, and a second target output calculating portion that calculates the second target drive force related value.

10. A controlling apparatus for a continuously variable transmission according to claim 4, wherein the controlling apparatus further includes a target rotation speed calculating portion that calculates a target rotation speed based on a target output set by the target drive force related value setting portion based on the target rotation speed.

11. A controlling apparatus for a continuously variable transmission according to claim 10, wherein the controlling apparatus further includes a transitional target rotation speed calculating portion that calculates a transitional target rotation speed based on the target rotation speed set by the target rotation speed calculating portion.

12. A controlling apparatus for a continuously variable transmission according to claim 4, wherein the continuously variable transmission has a pulley including a first rotary member attached to the input shaft axially non-shiftably and circumferentially non-rotatable, a second rotary member attached to the input shaft axially shiftable but circumferentially non-rotatable and forming V-shaped groove together with the first rotary member, and the second rotary member being axially shifted to change the speed-change ratio.

13. A controlling method for a continuously variable transmission, in which the continuously variable transmission is disposed in a power transmitting route extending from a power source for running driving wheels of a vehicle, and the controlling method sets a target rotation speed of an input shaft of the continuously variable transmission based on a target drive force related value related to a target drive force of the driving wheels, and changes a speed-change ratio so that an actual rotation speed of the input shaft coincides with the target rotation speed thereof, the method comprising:

calculating a first target drive force related value based on both an acceleration required amount and a load of an auxiliary machine driven by the power source for running, and a second target drive force related value without considering the auxiliary machine load; and setting the second target drive force related value as the drive force related value upon a vehicle regular running, the vehicle regular running includes maintaining a vehicle speed at a target vehicle speed by a speed controlling device.

14. A controlling apparatus for a continuously variable transmission according to claim 1, wherein the target drive force related value setting portion sets the second target drive force related value as the target drive force related value upon the vehicle regular running so that even in fluctuation of the auxiliary machine load during the vehicle regular running, the target drive force related value is not fluctuated to prevent fluctuation of the target rotation speed.

15. A controlling apparatus for a continuously variable transmission according to claim 2, wherein the target drive force related value setting portion sets the second target drive force related value as the target drive force related value upon the vehicle regular running so that even in fluctuation of the auxiliary machine load during the vehicle regular running, the target drive force related value is not fluctuated to prevent fluctuation of the target rotation speed.

* * * * *